United States Patent
Cheng et al.

(10) Patent No.: US 9,529,164 B1
(45) Date of Patent: Dec. 27, 2016

(54) BEAM-SPLITTING INTEGRATED OPTICAL ELEMENT AND OPTICAL TRANSMITTER MODULE

(71) Applicant: ELASER TECHNOLOGIES CO., LTD., New Taipei (TW)

(72) Inventors: Chu-Liang Cheng, New Taipei (TW); Yi-Tseng Lin, Taichung (TW)

(73) Assignee: ELASER TECHNOLOGIES CO., LTD., New Taipei (TW)

( * ) Notice: Subject to any disclaimer, the term of this patent is extended or adjusted under 35 U.S.C. 154(b) by 0 days.

(21) Appl. No.: 15/076,689

(22) Filed: Mar. 22, 2016

(30) Foreign Application Priority Data

Dec. 23, 2015 (TW) .............................. 104143340 A

(51) Int. Cl.
*G02B 6/42* (2006.01)
*G02B 27/14* (2006.01)
*G02B 27/30* (2006.01)

(52) U.S. Cl.
CPC ............. *G02B 6/4214* (2013.01); *G02B 27/14* (2013.01); *G02B 27/30* (2013.01)

(58) Field of Classification Search
CPC ..... G02B 6/4206; G02B 6/4214; G02B 27/30; G02B 27/14
See application file for complete search history.

(56) References Cited

U.S. PATENT DOCUMENTS

| 6,888,988 B2 | 5/2005 | Vancoille et al. |
| 8,933,391 B2 | 1/2015 | Yan et al. |
| 2001/0031111 A1 | 10/2001 | Irwin |
| 2009/0290834 A1 | 11/2009 | Niimura et al. |

FOREIGN PATENT DOCUMENTS

CN 2722271 8/2005

OTHER PUBLICATIONS

"Office Action of Taiwan Counterpart Application", issued on Apr. 21, 2016, p. 1-p. 3.

*Primary Examiner* — Ryan Lepisto
*Assistant Examiner* — Erin Chiem
(74) *Attorney, Agent, or Firm* — Jianq Chyun IP Office

(57) ABSTRACT

A beam-splitting integrated optical element including a shell, at least one first lens, and at least one second lens is provided. The shell includes a first lens surface, a second lens surface, at least one first reflective surface, and at least one second reflective surface. A bottom edge of each first reflective surface and a bottom edge of each second reflective surface are not connected to each other. The at least one first lens is disposed on the first lens surface. The at least one second lens is disposed on the second lens surface, and each second lens has a second optical axis. Each second reflective surface is located at at least one side of the corresponding second optical axis and located on a transmission path of only a portion of a first beam. An optical transmitter module incorporating said beam-splitting optical element is also provided.

20 Claims, 19 Drawing Sheets

BEAM-SPLITTING INTEGRATED OPTICAL ELEMENT AND OPTICAL TRANSMITTER MODULE

CROSS REFERENCE TO RELATED APPLICATION

This application claims the priority benefit of Taiwan application serial no. 104143340, filed on Dec. 23, 2015. The entirety of the above-mentioned patent application is hereby incorporated by reference herein and made a part of specification.

BACKGROUND OF THE INVENTION

1. Field of the Invention

The invention relates to a beam-splitting integrated optical element and an optical transmitter module.

2. Description of Related Art

With advancements in communication technologies, communication methods are no longer limited only to be implemented by using electrical signals. Recently, optical communication technologies have been developed to realize signal transmission with optical signals. Because transmission speed and distance of light is far higher and longer than electrons, optical communication technologies have gradually become the mainstream in the market. Based on high bandwidth requirements, demands for optical transmitter modules capable of transmitting massive amount of optical signal become higher each day. To ensure stability in the signal transmission, the optical transmitter modules often need to synchronously monitor the optical power. The optical transmitter modules using the edge emitting laser can use the back emitting light to monitor the front emitting light (i.e., the light used for transmission), so as to synchronously monitor the optical power. The optical transmitter module using the surface emitting laser must utilize optical elements to split the transmitted light in order to monitor the optical power. Therefore, the design of beam-splitting integrated optical element plays a fairly important role.

FIG. 1 is a schematic cross-sectional view of a conventional optical transmitter module. Referring to FIG. 1, an optical transmitter module 10 includes an optical element 12, lenses 14A, 14B and 14C, a light source 16 and an optical detector 18. A beam B emitted by the light source 16 is collimated by the lens 14A before entering the optical element 12 and then being transmitted to total internal reflection surfaces TIR1 and TIR2. Bottom edges of the total internal reflection surfaces TIR1 and TIR2 are connected and perpendicular to each other, such that a vertex X is formed. The beam B is split by the total internal reflection surfaces TIR1 and TIR2 and the vertex X to be transmitted towards different directions, wherein the beam B reflected by the total internal reflection surface TIR1 is converged into an optical fiber F through the lens 14B to be applicable for the signal transmission. On the other hand, the beam B reflected by the total internal reflection surface TIR2 is converged into the optical detector 18 through the lens 14C to be applicable for monitoring the optical power. In other words, the optical transmitter module 10 is capable of conducting the signal transmission and monitoring the optical power synchronously.

Since the vertex X formed by connecting the total internal reflection surfaces TIR1 and TIR2 together are prone to have curvature due to manufacturing process factors, the beam B is prone to be scattered at the vertex X, resulting in an optical power loss and a beam-splitting ratio offset thereby lowering a yield rate of the optical transmitter module 10. Further, during the assembly process of the optical transmitter module 10, a passive machine alignment is usually performed by viewing an image of the light source 16 through the lens 14B corresponding to the optical fiber F. However, in the architecture of the optical transmitter module 10, the entire image of the light source 16 cannot be viewed through the lens 14B since only a portion of the image of the light source 16 can be guided to the lens 14B through the total internal reflection surface TIR1, such that an alignment difficulty and a calibration time may both be increased during the assembly process. Accordingly, how to solve the aforementioned problems has become one of important issues in the related art.

SUMMARY OF THE INVENTION

The invention is directed to a beam-splitting integrated optical element capable of preventing the scattering due to beam-splitting at the vertex in order to lower the optical power loss and the beam-splitting ratio offset and facilitate in reduction of the alignment difficulty and the alignment time for the optical transmitter module.

The invention is further directed to an optical transmitter module having a beam-splitting integrated optical element which can provide a preferable yield rate, low alignment difficulty and short alignment time.

A beam-splitting integrated optical element of the invention includes a shell, at least one first lens, and at least one second lens. The shell includes a first lens surface, a second lens surface, at least one first reflective surface, and at least one second reflective surface. The second lens surface is perpendicular to the first lens surface. The first reflective surface and the second reflective surface are located above the first lens surface. A bottom edge of each first reflective surface close to the first lens surface and a bottom edge of each second reflective surface close to the first lens surface are not connected to each other. The first lens is disposed on the first lens surface, and each first lens has a first optical axis. The second lens is disposed on the second lens surface, and each second lens has a second optical axis. The first reflective surface is located above the first lens and inclined to the first optical axis and the second optical axis. Each first reflective surface is adapted to reflect at least a portion of the first beam from the corresponding first lens so that the portion of the first beam is transmitted along a first direction parallel to the second optical axis. Each second reflective surface is located at at least one side of the corresponding second optical axis and located on a transmission path of another portion of the first beam, and inclining directions of the first reflective surface and the second reflective surface are opposite so that the another portion of the first beam transmitted to the second reflective surface is transmitted along a second direction different from the first direction after being reflected by the second reflective surface.

An optical transmitter module of the invention includes a beam-splitting integrated optical element, at least one first light source and at least one optical detector. The beam-splitting integrated optical element includes a shell, at least one first lens, and at least one second lens. The shell includes a first lens surface, a second lens surface, at least one first reflective surface, and at least one second reflective surface. The second lens surface is perpendicular to the first lens surface. The first reflective surface and the second reflective surface are located above the first lens surface. A bottom edge of each first reflective surface close to the first lens surface and a bottom edge of each second reflective surface close to the first lens surface are not connected to each other. The first lens is disposed on the first lens surface, and each first lens has a first optical axis. The second lens is disposed on the second lens surface, and each second lens has a second optical axis. The first light source is located below the first lens surface. Each first light source is disposed below one of the at least one first lens and adapted to emit a first beam towards the corresponding first lens. The first reflective surface is located above the first lens and inclined to the first optical axis and the second optical axis. Each first reflective surface is adapted to reflect at least a portion of the first beam from the corresponding first lens so that the portion of the first beam is transmitted along a first direction parallel to the second optical axis. Each second reflective surface is located at at least one side of the corresponding second optical axis and located on a transmission path of another portion of the first beam, and inclining directions of the first reflective surface and the second reflective surface are opposite so that the another portion of the first beam transmitted to the second reflective surface is transmitted along a second direction different from the first direction after being reflected by the second reflective surface. The optical detector is located on the transmission path of the another portion of the first beam reflected by the second reflective surface to receive the first beam reflected by the second reflective surface.

Based on the above, the beam-splitting integrated optical element of the invention adopts the design in which the bottom edges of the first reflective surface and the second reflective surface are not connected to each other in order to prevent formation of the vertex. As such, the optical power loss and the beam-splitting ratio offset caused by scattering of the beam at the vertex in the conventional art may be solved to improve the yield rate of the optical transmitter module, so as to facilitate improvements for the alignment difficulty and the alignment time induced by unclear image of the light source and incomplete borders caused by scattering of the beam at the vertex.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
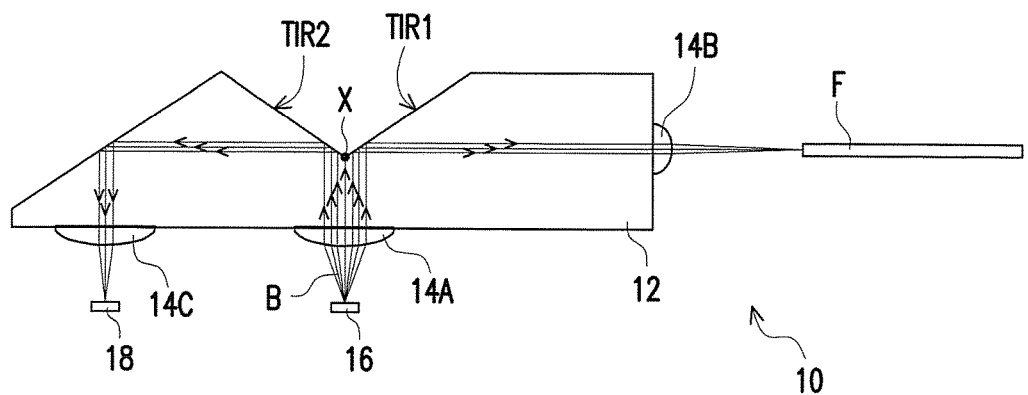
FIG. 1 is a schematic cross-sectional view of a conventional optical transmitter module.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
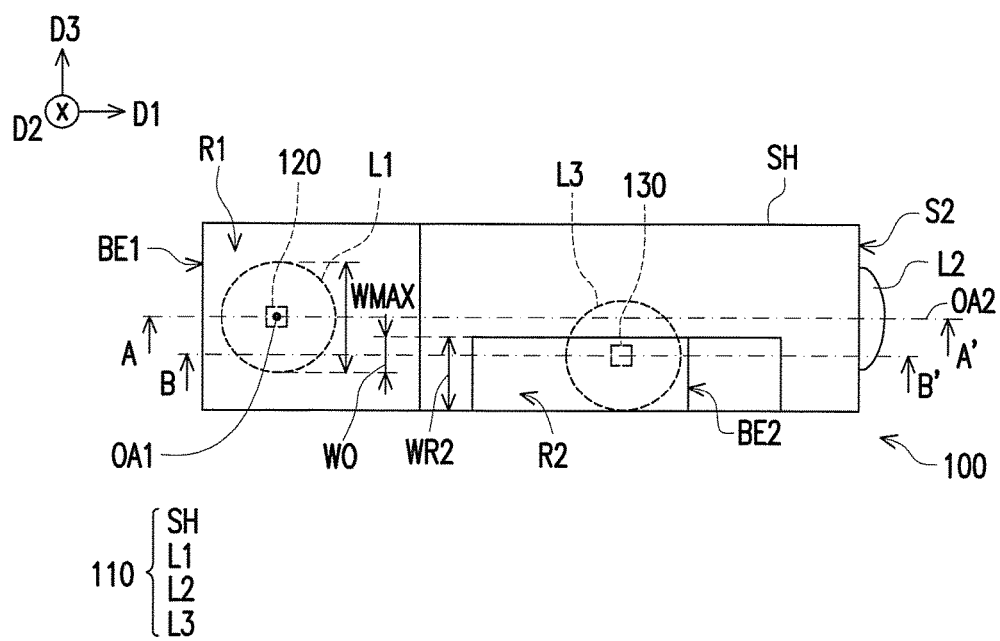
FIG. 2A is a schematic top view of an optical transmitter module according to a first embodiment of the invention.
Figure 2B:
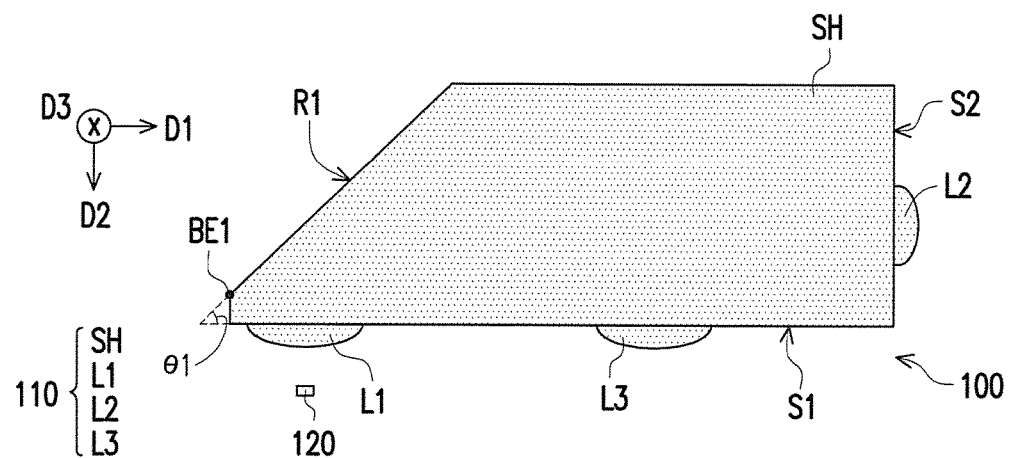
FIG. 2B and FIG. 2C are respectively schematic cross-sectional views along section lines A-A' and B-B' in FIG. 2A.
Figure 2C:
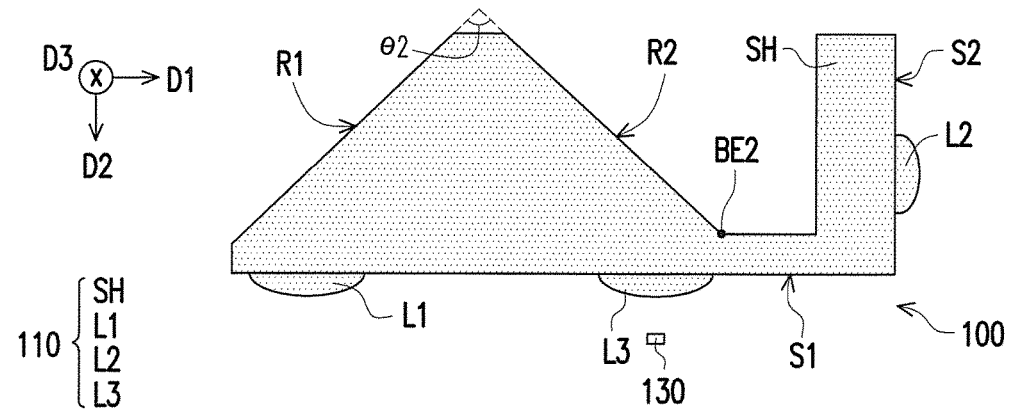
Figure 2D:
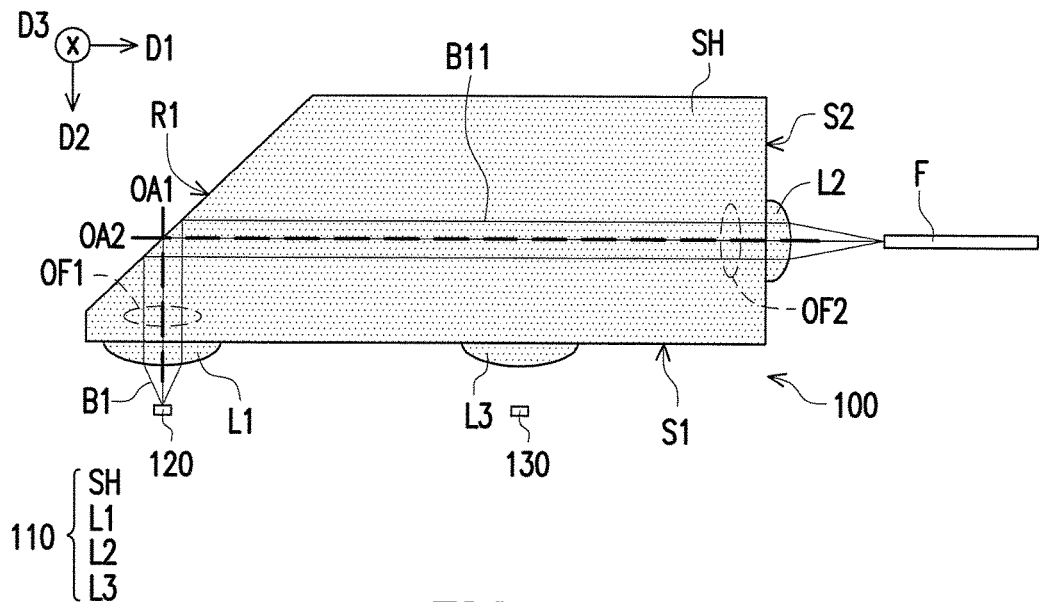
FIG. 2D and FIG. 2E are schematic diagrams of an optical path of the optical transmitter module in FIG. 2A.
Figure 2E:
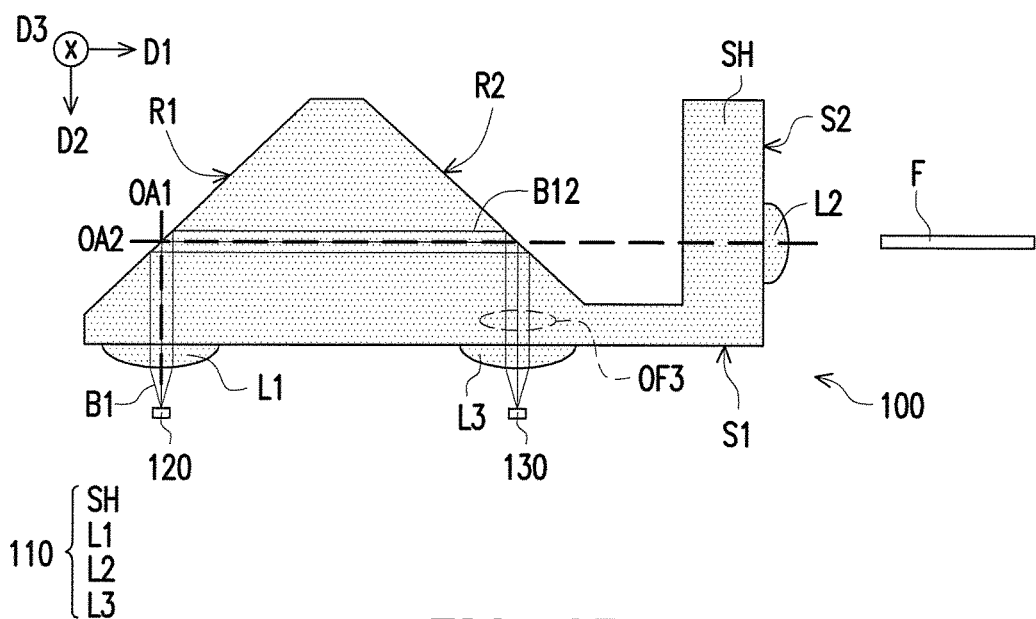
Figure 2F:
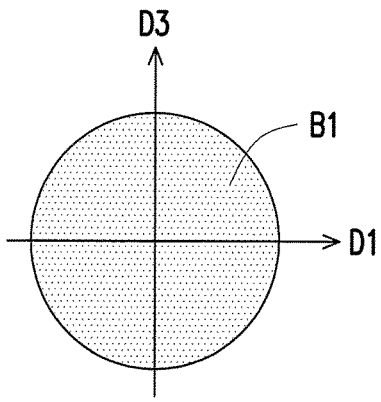
FIG. 2F and FIG. 2G are respectively schematic diagrams of optical fields OF1 and OF2 in FIG. 2D.
Figure 2G:
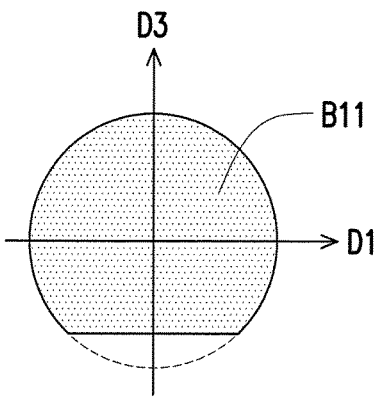
Figure 2H:
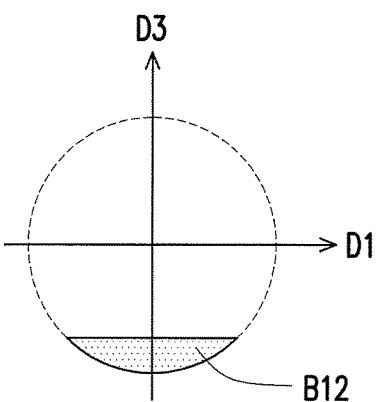
FIG. 2H is a schematic diagram of an optical field OF3 in FIG. 2E.

FIG. 2A is a schematic top view of an optical transmitter module according to a first embodiment of the invention. FIG. 2B and FIG. 2C are respectively schematic cross-sectional views along section lines A-A' and B-B' in FIG. 2A. FIG. 2D and FIG. 2E are schematic diagrams of an optical path of the optical transmitter module in FIG. 2A. FIG. 2F and FIG. 2G are respectively schematic diagrams of optical fields OF1 and OF2 in FIG. 2D. FIG. 2H is a schematic diagram of an optical form OF3 in FIG. 2E.

Referring to FIG. 2A to FIG. 2H, an optical transmitter module 100 includes a beam-splitting integrated optical element 110, at least one first light source 120 and at least one optical detector 130. In this embodiment, the number of each of the first light source 120 and the optical detector 130 is one, but not limited thereto.

The beam-splitting integrated optical element 110 includes a shell SH, at least one first lens L1, and at least one second lens L2. In this embodiment, the number of each of the first lens L1 and the second lens L2 is one, but not limited thereto. All the elements in the beam-splitting integrated optical element 110 may be integrally formed as one. Specifically, the beam-splitting integrated optical element 110 may be manufactured by molding, and a material of the beam-splitting integrated optical element 110 may be Ultem, but not limited thereto.

Referring to FIG. 2B and FIG. 2C, the shell SH includes a first lens surface S1, a second lens surface S2, at least one first reflective surface R1, and at least one second reflective surface R2. The second lens surface S2 is perpendicular to the first lens surface S1. The first reflective surface R1 and the second reflective surface R2 are located above the first lens surface S1. A bottom edge BE1 of each first reflective surface R1 close to the first lens surface S1 and a bottom edge BE2 of each second reflective surface R2 close to the first lens surface S1 are not connected to each other. In this embodiment, the number of each of the first reflective surface R1 and the second reflective surface R2 is one, but not limited thereto.

Referring to FIG. 2D and FIG. 2E, the first lens L1 is disposed on the first lens surface S1, and each first lens L1 has a first optical axis OA1. The first light source 120 is located below the first lens surface S1. Each first light source 120 is disposed below one of the at least one first lens L1 and adapted to emit a first beam B1 towards the corresponding first lens L1. The first light source 120 may be a laser light source, such as a surface-emitting laser, but not limited thereto. The first lens L1 faces the first light source 120, and the first lens L1 is adapted to collimate the first beam B1 from the first light source 120. Based on different design requirements, shapes of the first lens L1 and the collimated beam (indicated by dash line in FIG. 2A) may be circle or oval. FIG. 2A shows that the shapes of the first lens L1 and the collimated beam are circle, but not limited thereto.

The second lens L2 is disposed on the second lens surface S2, and each second lens L2 has a second optical axis OA2. The second lens L2 faces an optical fiber F coupled to the beam-splitting integrated optical element 110, and the second lens L2 is adapted to converge a portion of the first beam B1 (e.g., a first beam B11) into the optical fiber F.

The first reflective surface R1 is located above the first lens L1 and inclined to the first optical axis OA1 and the second optical axis OA2. Each first reflective surface R1 is adapted to reflect at least a portion of the first beam B1 from the corresponding first lens L1 so that at least the portion of the first beam B1 (e.g., the first beam B11) is transmitted along a first direction D1 parallel to the second optical axis OA2. The first reflective surface R1 can reflect the first beam B1 by the total internal reflection method or a reflective film coated thereon. In the former architecture, an interior angle θ1 (referring to FIG. 2B) sandwiched by the first reflective surface R1 and a plane where the first lens L1 is located (e.g., the first lens surface S1) is, for example, 45 degrees.

Referring to FIG. 2A and FIG. 2E, each second reflective surface R2 is located at at least one side of the corresponding second optical axis OA2 and located on a transmission path of another portion of the first beam B1 (e.g., a first beam B12), and inclining directions of the first reflective surface R1 and the second reflective surface R2 are opposite so that the first beam B12 transmitted to the second reflective surface R2 is transmitted along a second direction D2 different from the first direction D1 after being reflected by the second reflective surface R2. The second reflective surface R2 can reflect the first beam B12 by the total internal reflection method or a reflective film coated thereon. In the former architecture, the second reflective surface R2 is perpendicular to the first reflective surface R1, that is, an interior angle θ2 (referring to FIG. 2C) sandwiched by the second reflective surface R2 and the first reflective surface R1 is 90 degrees.

Referring to FIG. 2D and FIG. 2E, the second reflective surface R2 of the present embodiment is located between the first reflective surface R1 and the second lens surface S2. The first beam B1 from the first light source 120 is transmitted to the first reflective surface R1 after being collimated by the first lens L1. The first reflective surface R1 reflects the first beam B1 so that the first beam B1 is transmitted in the first direction D1 perpendicular to the first optical axis OA1. The portion of the first beam B1 (e.g., the first beam B11) transmitted along the first direction D1 is converged into the optical fiber F corresponding to the beam-splitting integrated optical element 110 by the corresponding second lens L2. On the other hand, the another portion of the first beam B1 (e.g., the first beam B12) transmitted along the first direction D1 is reflected by the second reflective surface R2 to change direction again to be transmitted along the second direction D2 perpendicular to the first direction D1. The optical detector 130 is disposed corresponding to the second reflective surface R2 and adapted to receive the first beam B12.

The beam-splitting integrated optical element 110 may further include at least one third lens L3. The third lens L3 is located on the transmission path of the first beam B12 reflected by the second reflective surface R2, and the first beam B12 reflected by the second reflective surface R2 passes through the corresponding third lens L3 along the second direction D2 to be converged by the third lens L3 to the optical detector 130. In this embodiment, the number of the third lens L3 is one, but not limited thereto.

The beam-splitting integrated optical element 110 adopts the design in which the bottom edges of the first reflective surface R1 and the second reflective surface R2 are not connected to each other in order to prevent the vertex X in FIG. 1 from causing beam-splitting. As such, the optical power loss and the beam-splitting ratio offset caused by scattering of the beam at the vertex X in the conventional art may be solved to improve the yield rate of the optical transmitter module, so as to facilitate improvements for the alignment difficulty and the alignment time induced by unclear image of the light source and incomplete borders caused by scattering of the beam at the vertex X. Accordingly, the optical transmitter module 100 can provide a more preferable yield rate, a lower alignment difficulty and a shorter alignment time.

It is worth mentioning that, a beam-splitting ratio (i.e., an integration ratio of light intensity and area in a cross section of the first beam B11 in FIG. 2G and a cross section of the first beam B12 in FIG. 2H) may be varied by varying a width WR2 of the second reflective surface R2 in the present embodiment. More specifically, referring to FIG. 2A, a beam maximum width of the first beam B1 from the first light source 120 collimated by the first lens L1 (indicated by dash line in FIG. 2A) is WMAX. The beam maximum width WMAX is overlapped with the second reflective surface R2 having the width WR2 in a third direction D3, and an overlapped width WO is smaller than the beam maximum width WMAX. The second reflective surface R2 may receive more of the first beam B1 if the overlapped width WO is greater, whereas the second reflective surface R2 may receive less of the first beam B1 if the overlapped width WO is smaller. With a center position and the beam maximum width WMAX of the first beam B1 in the first direction D1 remaining unchanged, if the width WR2 of the second reflective surface R2 is greater, the overlapped width WO is greater and a proportion of the first beam B12 in the first beam B1 is greater. In other words, a size of the width WR2 of the second reflective surface R2 or the overlapped width WO may be used to vary the beam-splitting ratio. As compared to the optical transmitter module 10 of FIG. 1 which requires fine-tuning relative positions of the light source 16 and the vertex X where the total internal reflection surfaces TIR1 and TIR2 are intersected in order to vary the beam-splitting ratio, the method of varying the beam-splitting ratio by utilizing the width WR2 of the second reflective surface R2 in the present embodiment may be relatively more precise and more efficient for providing a greater alignment tolerance.

Further, since it does not require a high optical energy to monitor the optical power, a center beam (i.e., an area where the optical energy is strongest) of the first beam B1 of the present embodiment may all be transmitted to the optical fiber F for the signal transmission. As compared to the center beam of the beam B in FIG. 1 which is easily scattered by the vertex X, the present embodiment is capable of maintaining the optical energy in the signal transmission.

Figure 3A:
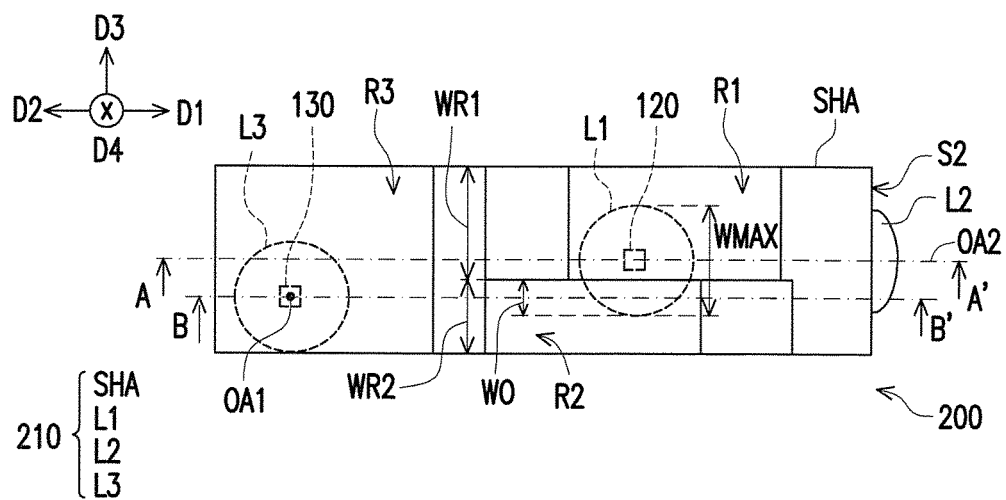
FIG. 3A is a schematic top view of an optical transmitter module according to a second embodiment of the invention.
Figure 3B:
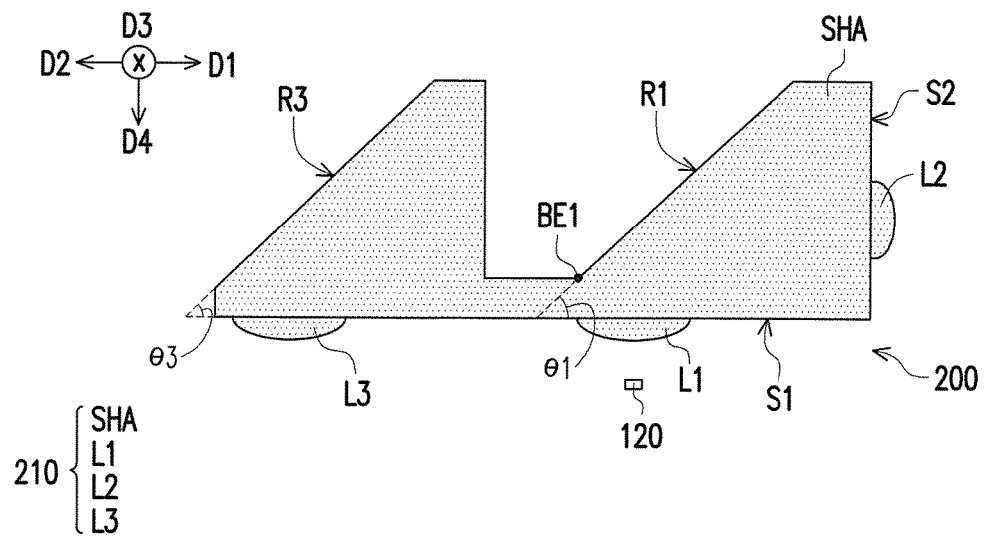
FIG. 3B and FIG. 3C are respectively schematic cross-sectional views along section lines A-A' and B-B' in FIG. 3A.
Figure 3C:
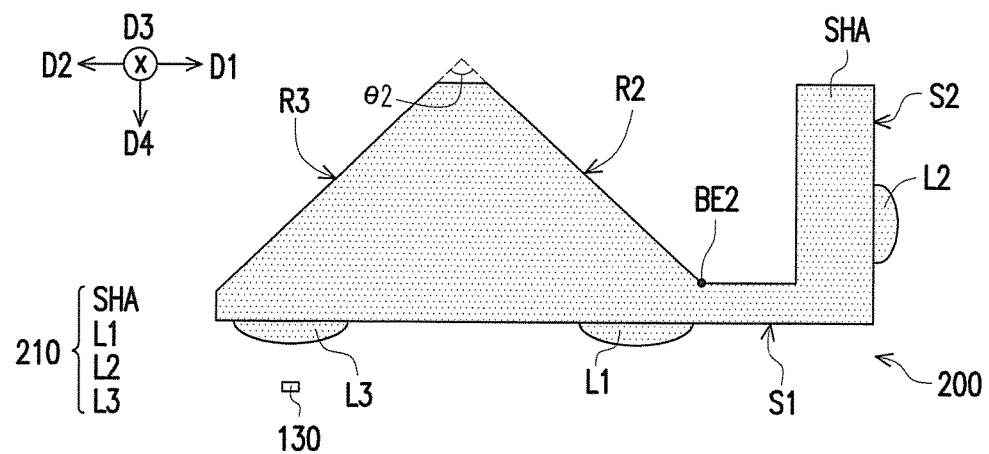
Figure 3D:
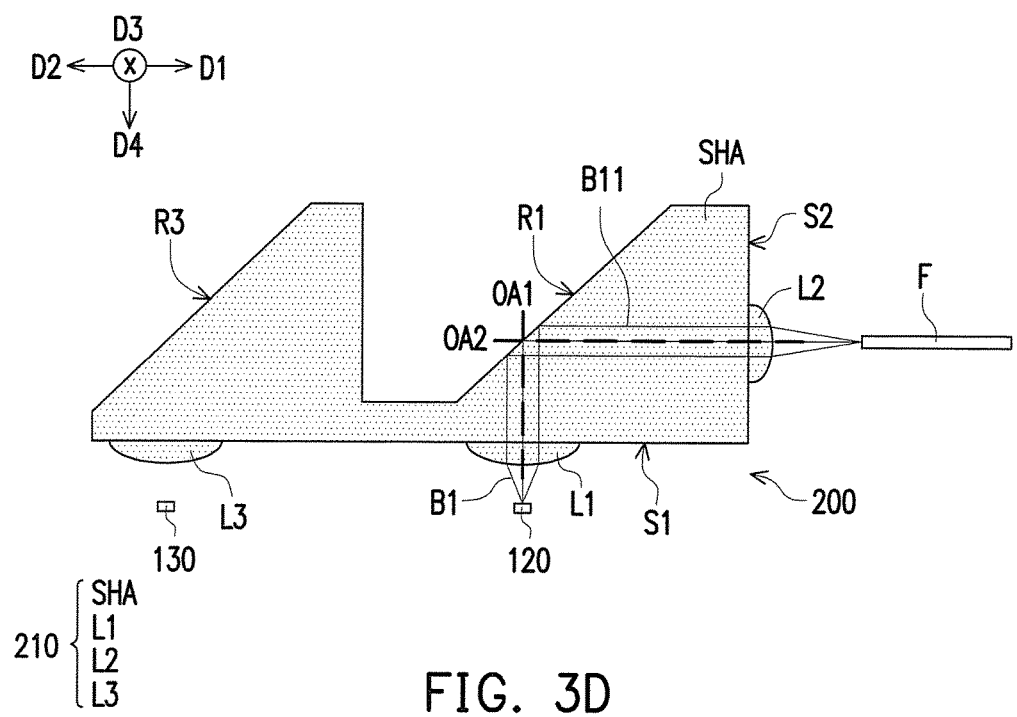
FIG. 3D and FIG. 3E are schematic diagrams of an optical path of the optical transmitter module in FIG. 3A.
Figure 3E:
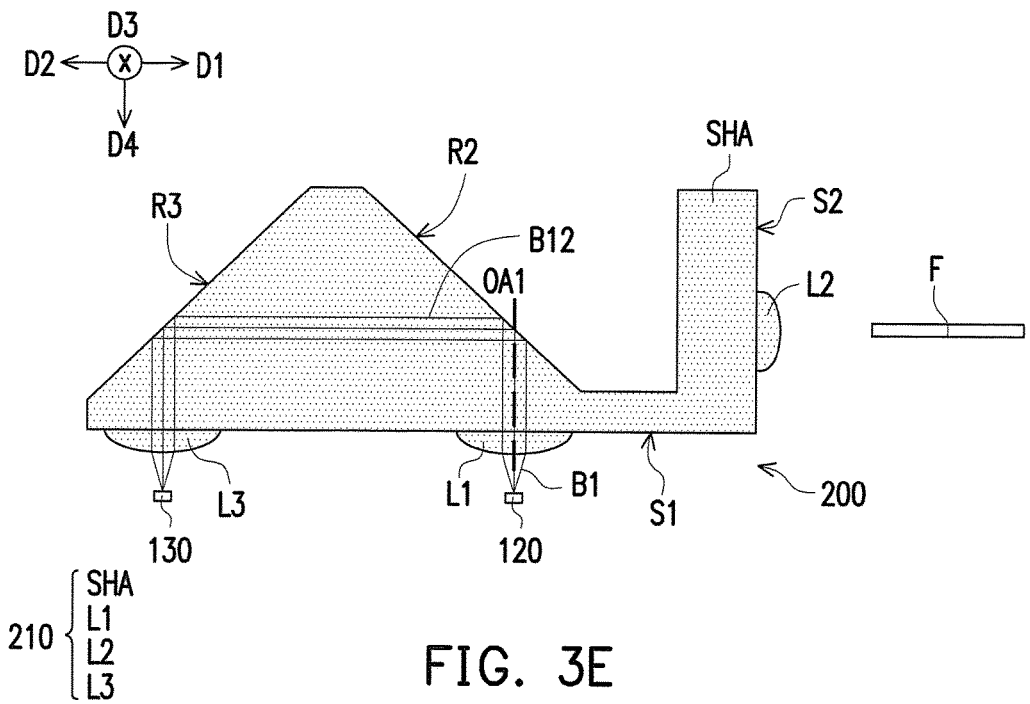

FIG. 3A is a schematic top view of an optical transmitter module according to a second embodiment of the invention. FIG. 3B and FIG. 3C are respectively schematic cross-sectional views along section lines A-A' and B-B' in FIG. 3A. FIG. 3D and FIG. 3E are schematic diagrams of an optical path of the optical transmitter module in FIG. 3A. Referring to FIG. 3A to FIG. 3E, an optical transmitter module 200 is similar to the optical transmitter module 100, and the same elements are indicated by the same reference numbers, which are not repeated hereinafter.

A major difference between the optical transmitter module 200 and the optical transmitter module 100 is that, in a beam-splitting integrated optical element 210, a first reflective surface R1 and a second reflective surface R2 of a shell SHA are arranged in the third direction D3 perpendicular to the first optical axis OA1 and the second optical axis OA2. Further, the projection of the first lens L1 is overlapped with the first reflective surface R1 and the second reflective surface R2 so that after the first beam B1 from the first light source 120 is collimated by the first lens L1 (the beam maximum width being WMAX), a portion of the first beam B1 is irradiated on the first reflective surface R1 while another portion is irradiated on the second reflective surface R2.

In addition, the shell SHA further includes at least one third reflective surface R3. In this embodiment, the number of the third reflective surface R3 is one, but not limited thereto. Referring to FIG. 3E, the third reflective surface R3 is inclined to and located above the first lens surface S1. Inclining directions of the third reflective surface R3 and the second reflective surface R2 are opposite and the third reflective surface R3 is located on the transmission path of the first beam B12 reflected by the second reflective surface R2. After being reflected by the second reflective surface R2, the first beam B12 is transmitted to the third reflective surface R3 along the second direction D2 opposite to the first direction D1. The third reflective surface R3 transmits the first beam B12 from the second reflective surface R2 to the optical detector 130 in a fourth direction D4 parallel to the first optical axis OA1. The third reflective surface R3 can reflect the beam transmitted in the beam-splitting integrated optical element 210 by the total internal reflection method or a reflective film coated thereon. In the former architecture, an interior angle θ3 (referring to FIG. 3B) sandwiched by the third reflective surface R3 and a plane where the first lens L1 is located (e.g., the first lens surface S1) is, for example, 45 degrees.

The beam-splitting integrated optical element 210 may further include at least one third lens L3. The third lens L3 is disposed on the first lens surface S1 and located below the third reflective surface R3. After being reflected by the third reflective surface R3, the first beam B12 is converged by the third lens L3 to the optical detector 130 along the fourth direction D4. In this embodiment, the number of the third lens L3 is one, but not limited thereto.

The beam-splitting integrated optical element 210 can also solve the optical power loss and the beam-splitting ratio offset caused by scattering of the beam at the vertex X of FIG. 1 in the conventional art by the design in which the bottom edges of the first reflective surface R1 and the second reflective surface R2 are not connected to each other, so that the optical transmitter module 200 using the beam-splitting integrated optical element 210 can also have more preferable light utilization and beam-splitting ratio uniformity as well as advantages of low alignment difficulty and short alignment time.

Further, the beam-splitting ratio may also be varied by varying the width WR2 of the second reflective surface R2 in the present embodiment. Alternatively, the beam-splitting ratio may be varied by varying a ratio of a width WR1 of the first reflective surface R1 and the width WR2 of the second reflective surface R2 in the third direction D3. More specifically, referring to FIG. 3A, with the center position and the maximum width WMAX of the first beam B1 remaining unchanged, the ratio of the width WR1 of the first reflective surface R1 and the width WR2 of the second reflective surface R2 will influence the overlapped width WO of the first beam B1 and the second reflective surface R2. The overlapped width WO is smaller if the width WR1 of the first reflective surface R1 is greater. On the other hand, the overlapped width WO is greater if the width WR1 of the first reflective surface R1 is smaller. As compared to the optical transmitter module 10 of FIG. 1 which requires fine-tuning relative positions of the light source 16 and the vertex X where the total internal reflection surfaces TIR1 and TIR2 are intersected in order to vary the beam-splitting ratio, the method of varying the beam-splitting ratio by utilizing the width WR2 of the second reflective surface R2 or varying the ratio of the width WR1 of the first reflective surface R1 and the width WR2 of the second reflective R2 in the present embodiment is relatively more precise and more efficient and can provide a greater alignment tolerance.

Further, since it does not require a high optical energy to monitor the optical power, a center beam (i.e., an area where the optical energy is strongest) of the first beam B1 may all be transmitted to the optical fiber F for the signal transmission. As compared to the center beam of the beam B in FIG. 1 which is easily scattered by the vertex X, the present embodiment is capable of maintaining a signal transmission amount.

Figure 4A:
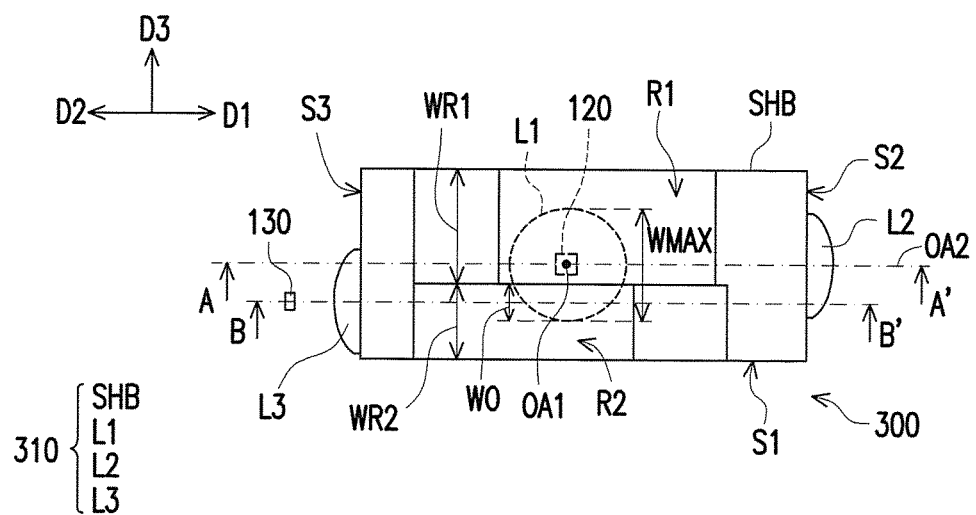
FIG. 4A is a schematic top view of an optical transmitter module according to a third embodiment of the invention.
Figure 4B:
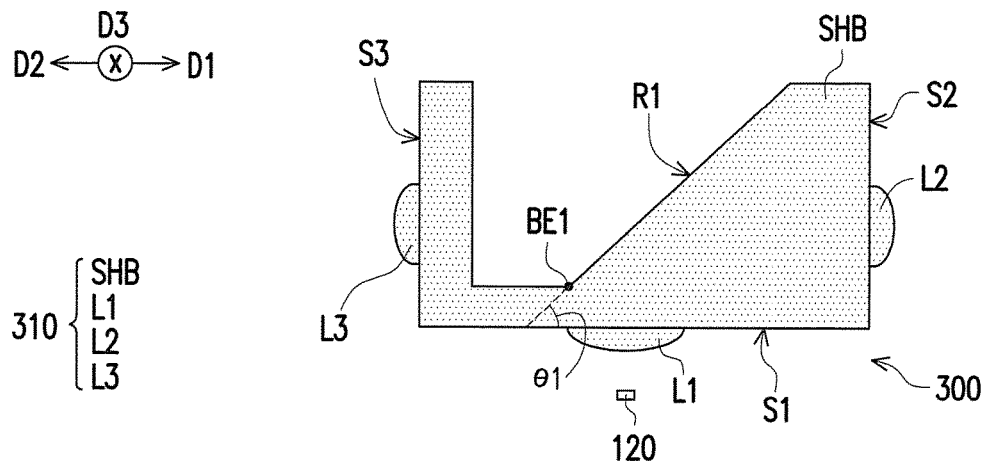
FIG. 4B and FIG. 4C are respectively schematic cross-sectional views along section lines A-A' and B-B' in FIG. 4A.
Figure 4C:
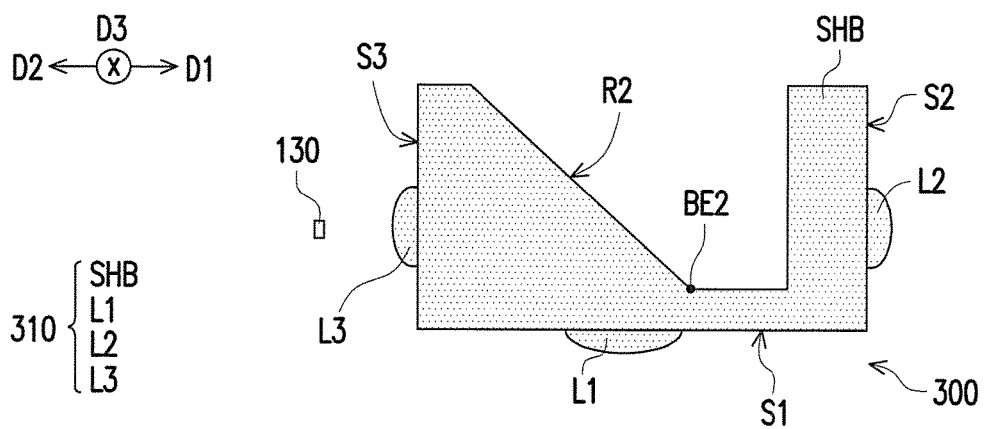
Figure 4D:
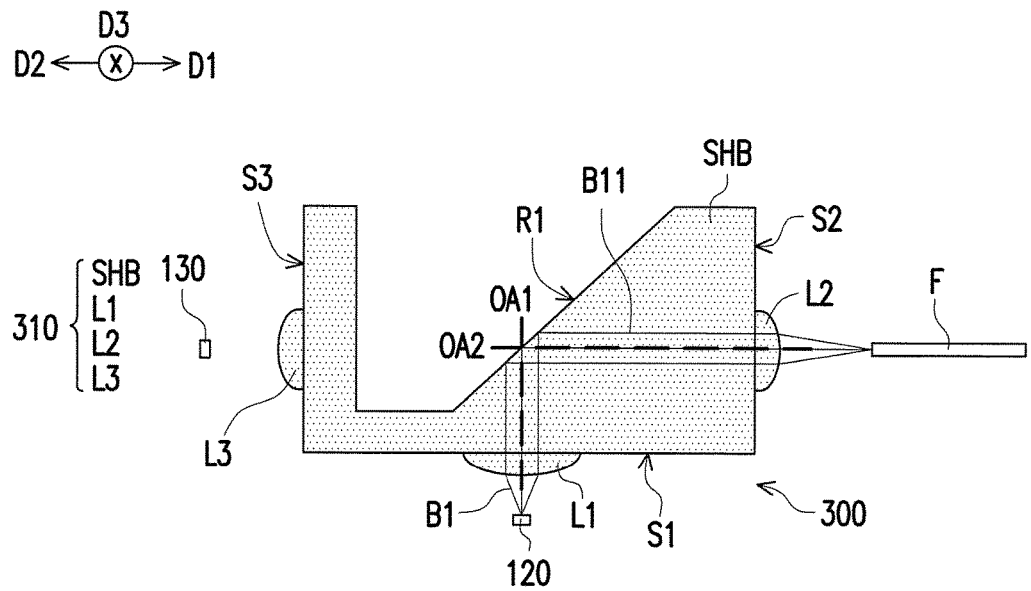
FIG. 4D and FIG. 4E are schematic diagrams of an optical path of the optical transmitter module in FIG. 4A.
Figure 4E:
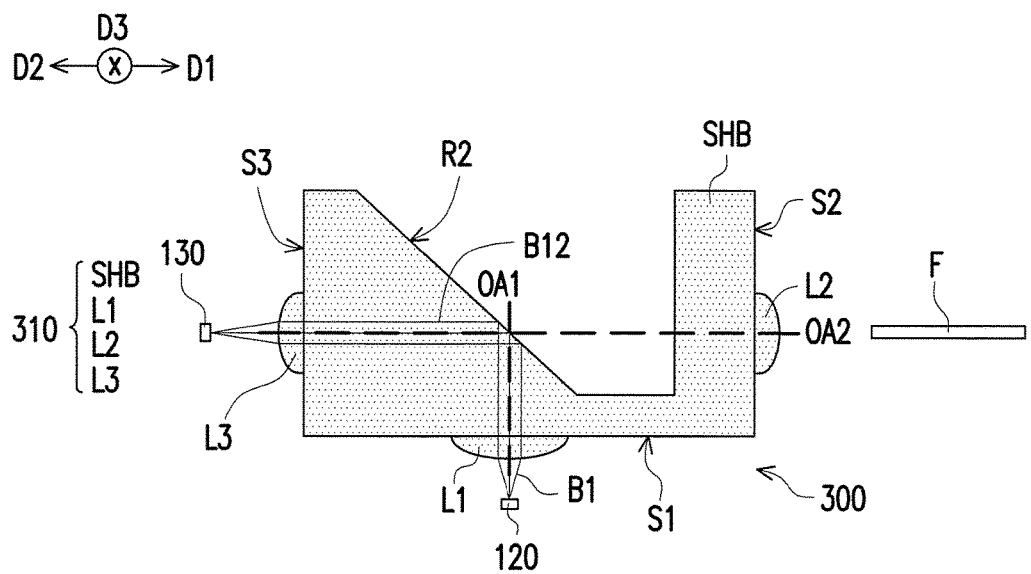

FIG. 4A is a schematic top view of an optical transmitter module according to a third embodiment of the invention. FIG. 4B and FIG. 4C are respectively schematic cross-sectional views along section lines A-A' and B-B' in FIG. 4A. FIG. 4D and FIG. 4E are schematic diagrams of an optical path of the optical transmitter module in FIG. 4A. Referring to FIG. 4A to FIG. 4E, an optical transmitter module 300 is similar to the optical transmitter module 200, where the same elements are indicated by the same reference numbers, and thus the disposition relation and effectiveness related thereto are not repeated hereinafter.

A major difference between the optical transmitter module 300 and the optical transmitter module 200 is that, in a beam-splitting integrated optical element 310, a shell SHB has a plane S3 as replacement to the third reflective surface R3. The plane S3 is connected and perpendicular to the first lens surface S1, and the third lens L3 is disposed on the plane S3.

Referring to FIG. 4D and FIG. 4E, after the first beam B1 from the first light source 120 is collimated by the first lens L1, a portion of the first beam B1 (e.g., the first beam B11) passes through the corresponding second lens surface S2 along the first direction D1 to be converged into the optical fiber F after being reflected by the first reflective surface R1. Another portion of the first beam B1 (e.g., the first beam B12) is transmitted along the second direction D2 and converged to the optical detector 130 through the third lens L3 after being reflected by the second reflective surface R2. It is worth mentioning that, in such architecture, another optical fiber F (not illustrated) may also be used to replace the optical detector 130 so that optical signal may be divided into two to be transmitted to different targets.

In each of the beam-splitting integrated optical elements 110, 210 and 310, a number ratio of the first reflective surface R1 and the second reflective surface R2 is 1:1, and the second reflective surface R2 is located at one single side of the second optical axis OA2. Specifically, the second optical axis OA2 of each second lens L2 passes through the first reflective surface R1 but does not pass through any second reflective surface R2, and the second reflective surface R2 and the second optical axis OA2 are arranged along the third direction D3. However, the invention is not limited to the above. In another embodiment, the shell may include two second reflective surfaces R2, that is, the number ratio of the first reflective surface R1 and the second reflective surface R2 is 1:2. The two second reflective surfaces R2 may be respectively located at two sides of the second optical OA2, and the second reflective surfaces R2 and the second optical axis OA2 are arranged along the third direction D3. Accordingly, the beam-splitting integrated optical element may also include similar functions above or even more extended functions (e.g., an integrity of the center beam may be effectively maintained, but not limited thereto), which are omitted herein.

Figure 5A:
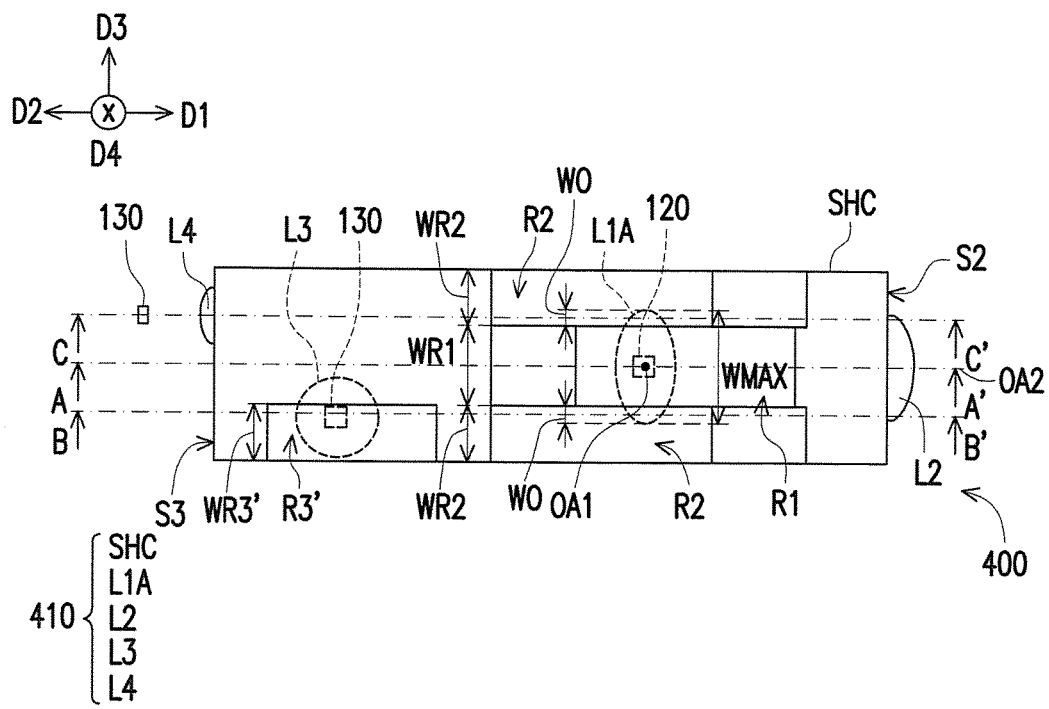
FIG. 5A is a schematic top view of an optical transmitter module according to a fourth embodiment of the invention.
Figure 5B:
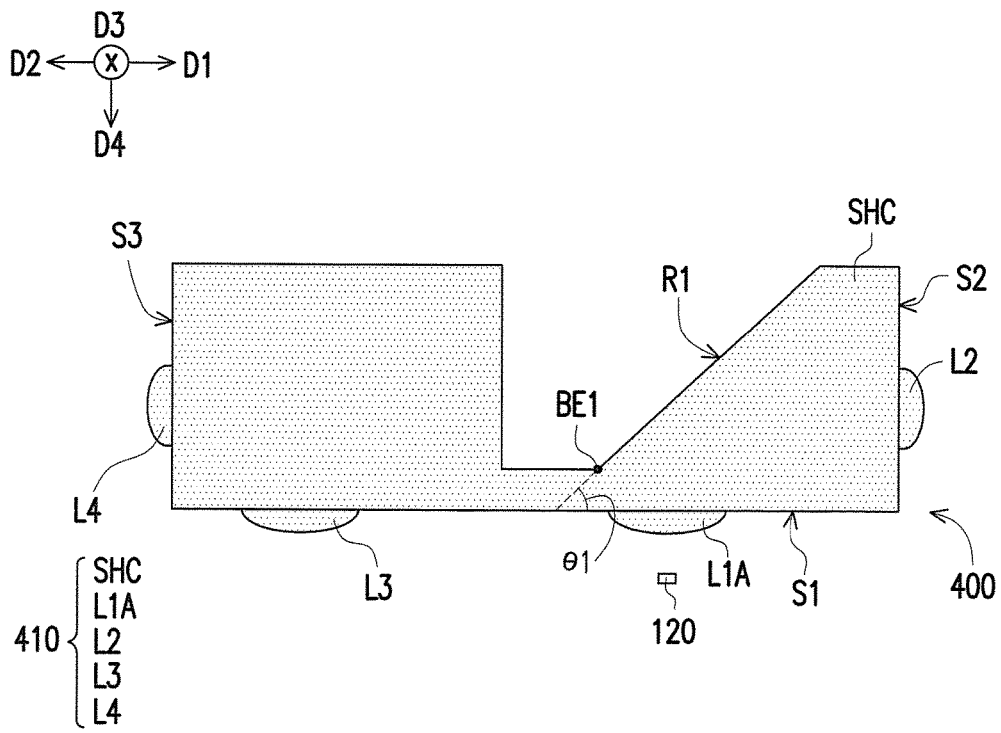
FIG. 5B to FIG. 5D are respectively schematic cross-sectional views along section lines A-A', B-B' and C-C' in FIG. 5A.
Figure 5C:
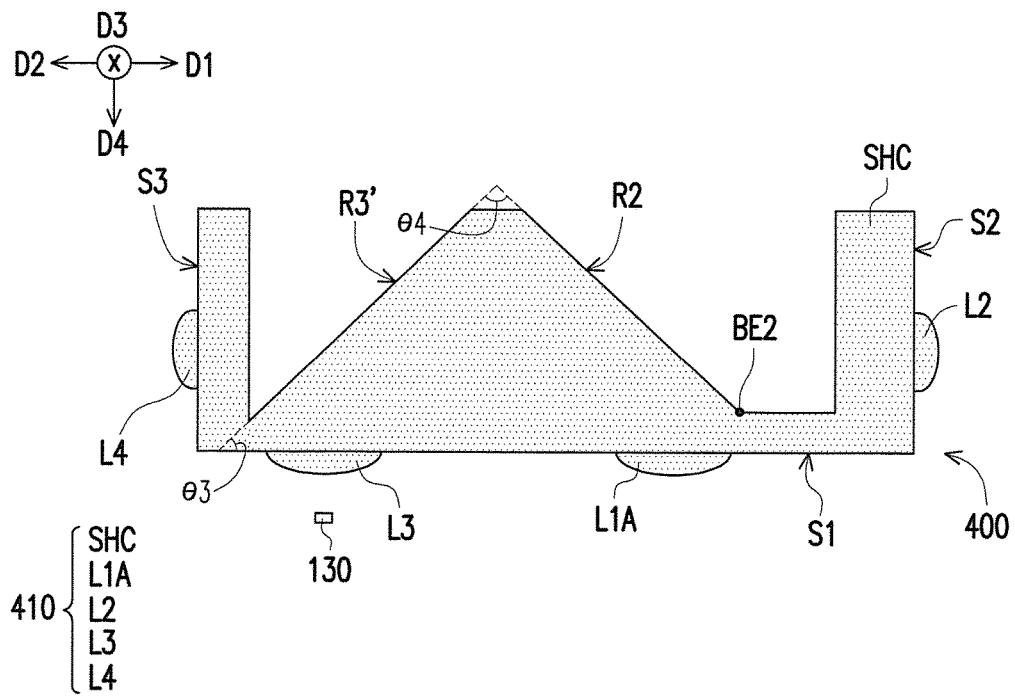
Figure 5D:
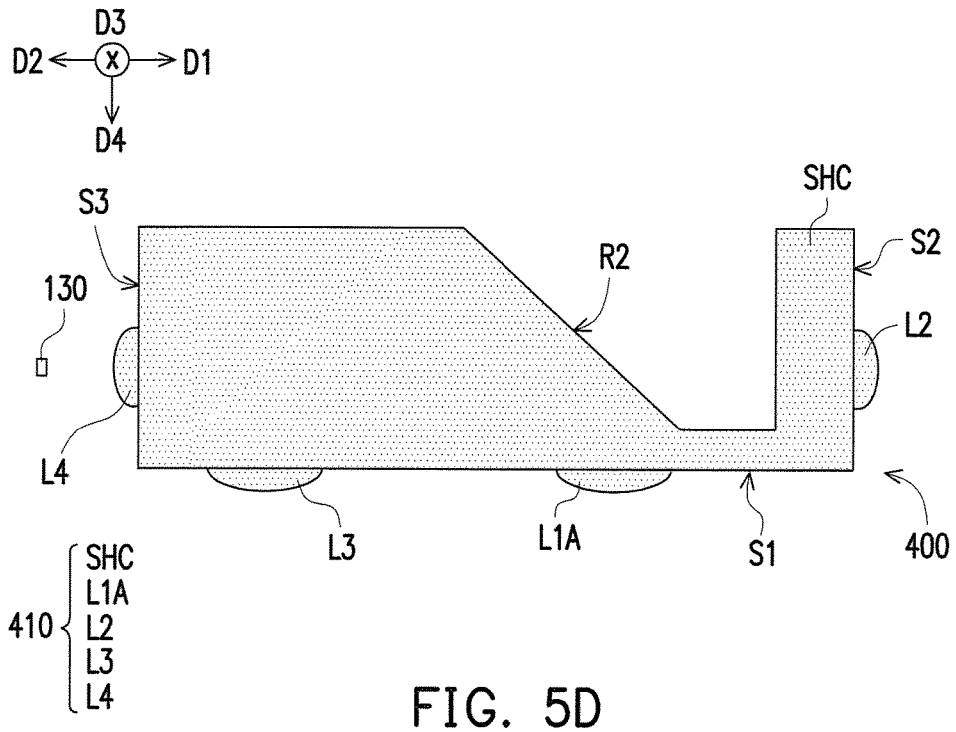
Figure 5E:
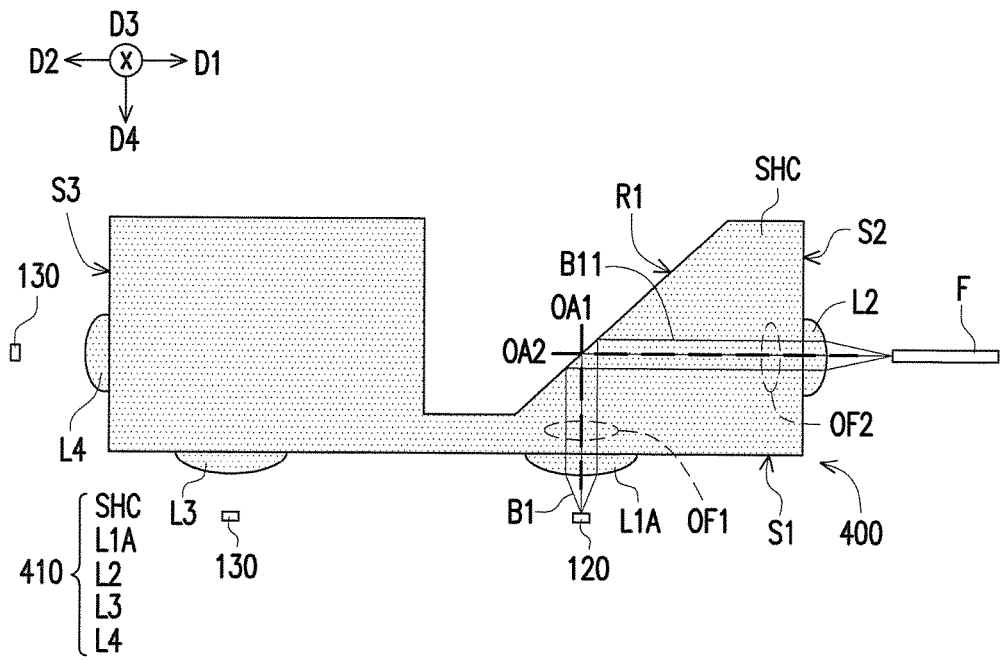
FIG. 5E to FIG. 5G are schematic diagrams of an optical path of the optical transmitter module in FIG. 5A.
Figure 5F:
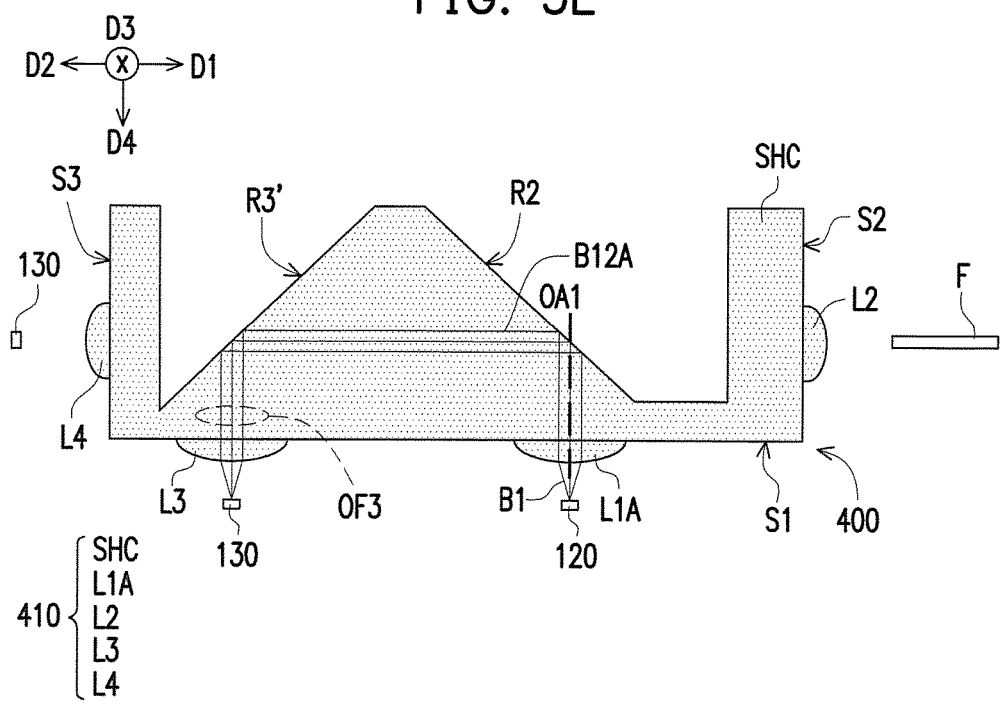
Figure 5G:
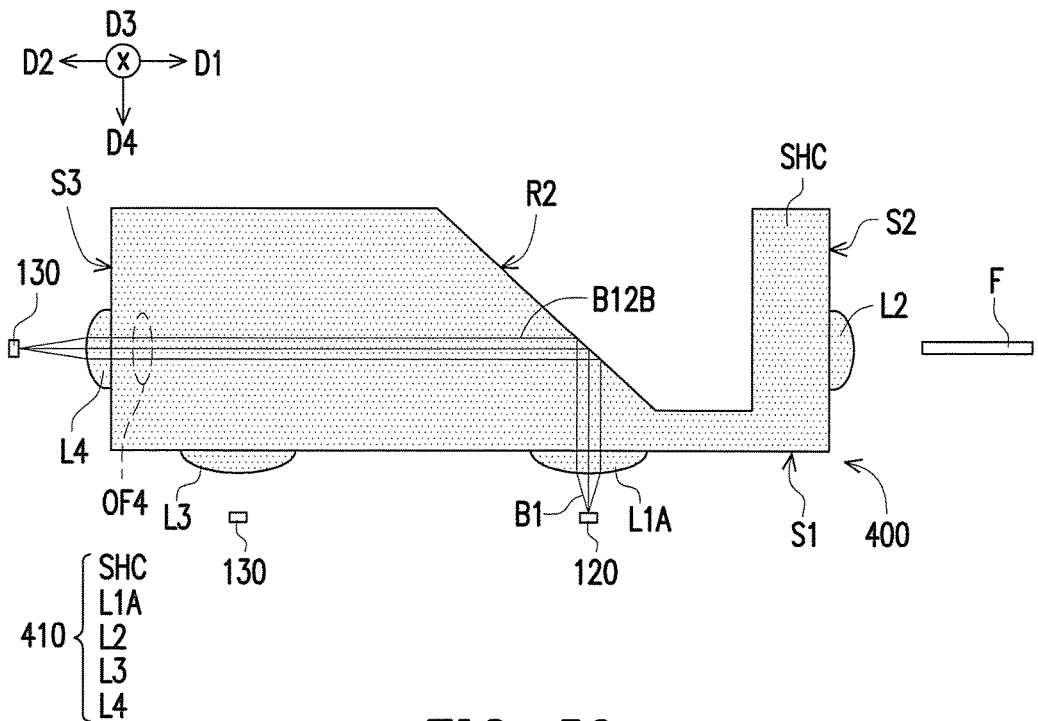
Figure 5H:
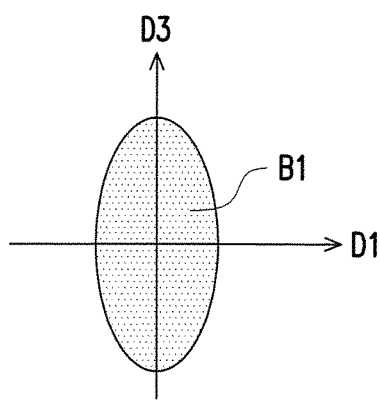
FIG. 5H and FIG. 5I are respectively schematic diagrams of optical fields OF1 and OF2 in FIG. 5E.
Figure 5I:
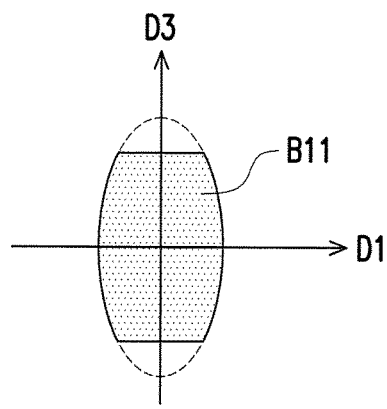
Figure 5J:
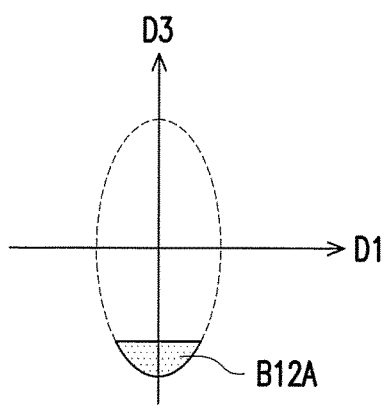
FIG. 5J is a schematic diagram of an optical field OF3 in FIG. 5F.
Figure 5K:
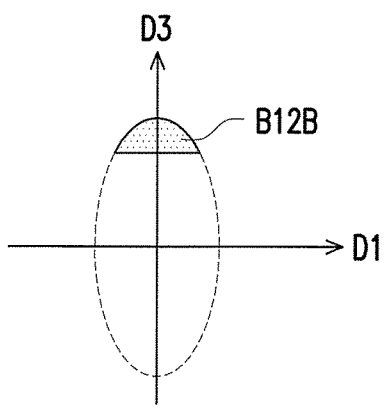
FIG. 5K is a schematic diagram of an optical field OF4 in FIG. 5G.

FIG. 5A is a schematic top view of an optical transmitter module according to a fourth embodiment of the invention. FIG. 5B to FIG. 5D are respectively schematic cross-sectional views along section lines A-A', B-B' and C-C' in FIG. 5A. FIG. 5E to FIG. 5G are schematic diagrams of an optical path of the optical transmitter module in FIG. 5A. FIG. 5H and FIG. 5I are respectively schematic diagrams of optical fields OF1 and OF2 in FIG. 5E. FIG. 5J is a schematic diagram of an optical field OF3 in FIG. 5F. FIG. 5K is a schematic diagram of an optical field OF4 in FIG. 5G. Referring to FIG. 5A to FIG. 5K, an optical transmitter module 400 is similar to the optical transmitter module 300, where the same elements are indicated by the same reference numbers, and thus the disposition relation and effectiveness related thereto are not repeated hereinafter.

A major difference between the optical transmitter module 400 and the optical transmitter module 300 is that, in a beam-splitting integrated optical element 410, a shell SHC includes two second reflective surfaces R2, that is, the number ratio of the first reflective surface R1 and the second reflective surface R2 is 1:2. The two second reflective surfaces R2 are arranged along the third direction D3 at two sides of the second optical axis OA2.

In addition, the shell SHC further includes at least one third reflective surface R3'. In this embodiment, the number of the third reflective surface R3' is one, but not limited thereto. The third reflective surface R3' is located above the first lens surface S1, and the third reflective surface R3' is located between one of the second reflective surface R2 and a third surface S3. A width WR3' of the third reflective surface R3' in the third direction D3 is at least partially overlapped with the width WR2 of the corresponding second reflective surface R2 in the third direction D3 so as to effectively transmit the beam from the corresponding second reflective surface R2.

Referring to FIG. 5C and FIG. 5F, the third reflective surface R3' is inclined to the first optical axis OA1 and the second optical axis OA2, and inclining directions of the third reflective surface R3' and the second reflective surface R2 are opposite. The third reflective surface R3' can reflect the beam transmitted in the beam-splitting integrated optical element 410 by the total internal reflection method or a reflective film coated thereon. In the former architecture, an interior angle θ4 sandwiched by the third reflective surface R3' and the second reflective surface R2 is, for example, 90 degrees.

Further, the beam-splitting integrated optical element 410 may further include at least one third lens L3 and at least one fourth lens L4. In this embodiment, the number of each of the third lens L3 and the fourth lens L4 is one, but not limited thereto. The third lens L3 is disposed on the first lens surface S1 and disposed below the third reflective surface R3', wherein a first lens L1A is located between the third lens L3 and the second lens L2.

Referring to FIG. 5G, the fourth lens L4 is disposed on the third surface S3 and located on a transmission path of a portion of the first beam B1 (e.g., a first beam B12B) from the second reflective surface R2, wherein the third lens L3 is located between the fourth lens L4 and the first lens L1A. In addition, the number of the optical detector 130 is two, wherein one of the optical detectors 130 is disposed below the third reflective surface R3' and disposed corresponding to the third lens L3, and another one of the optical detectors 130 is disposed corresponding to the fourth lens L4.

Referring to FIG. 5E to FIG. 5G, after the first beam B1 from the first source 120 is collimated by the first lens L1A, a portion of the first beam B1 (e.g., the first beam B11) passes through the corresponding second lens L2 along the first direction D1 to be converged into the optical fiber F by the corresponding second lens L2 after being reflected by the first reflective surface R1. The another portion of the first beam B1 is divided into a first sub beam B12A and a second sub beam B12B by the two second reflective surfaces R2. The first sub beam B12A is transmitted to the third reflective surface R3' along the second direction D2 after being reflected by the second reflective surface R2, and then passes through the corresponding third lens L3 along the fourth direction D4 to be converged to the optical detector 130 after being reflected by third reflective surface R3'. The second sub beam B12B is transmitted to the third surface S3 along the second direction D2 after being reflected by the second reflective surface R2, and then passes through the corresponding fourth lens L4 to be converged to the another optical detector 130 by the fourth lens L4. It is worth mentioning that, in such architecture, another optical fiber F (not illustrated) may also be used as replacement to the another optical detector 130 outside the fourth lens L4 so that the optical signal transmission may be divided into two to be transmitted to different targets.

Beam-splitting ratios of the first beam B11, the first sub beam B12A and the second sub beam B12B may be varied by varying the widths of the first reflective surface R1 and each of the second reflective surfaces R2 in the present embodiment. Further, with division for the first sub beam B12A and the second sub beam B12B, the first sub beam B12A and the second sub beam B12B may be provided for different usages. For instance, during an active optical path calibration, whether the first light source 120 is precisely disposed on a preset optical path may be determined by observing the optical form or the optical power of the first sub beam B12A and the second sub beam B12B. Alternatively, at least one of the first sub beam B12A and the second sub beam B12B may be used to observe a relative displacement of the first light source 120 and the first lens L1A in different ambient temperatures or may be used for other signal transmission.

In addition, by changing the design of the first lens L1A, the first light source 120 can be collimated as an elliptic cylinder form, such that the energies of the first sub beam B11, the first sub beam B12A and the second sub beam B12B may be re-distributed for other usages in the present embodiment. It should be noted that, modifications made to the shape of the first lens L1A are also applicable to other beam-splitting integrated optical elements, and related description thereof is omitted hereinafter.

Figure 6A:
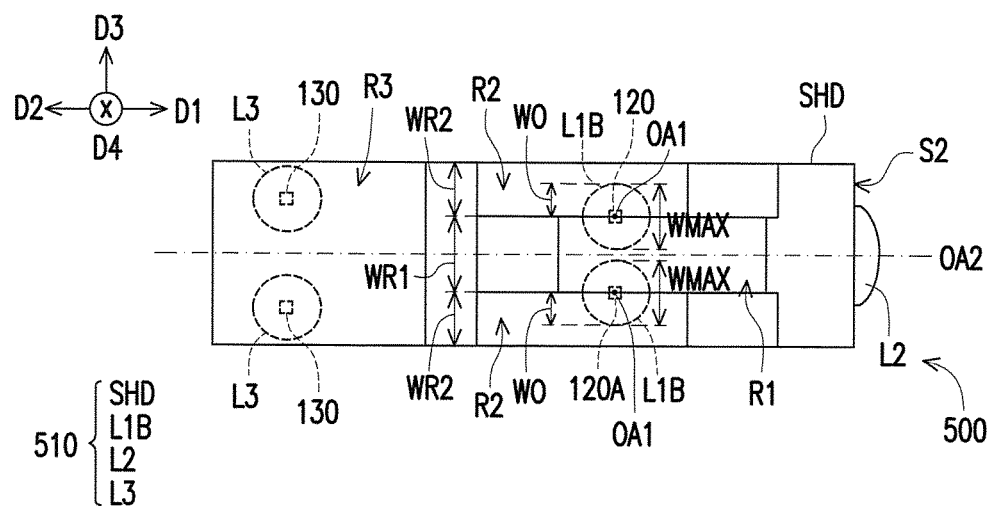
FIG. 6A is a schematic top view of an optical transmitter module according to a fifth embodiment of the invention.
Figure 6B:
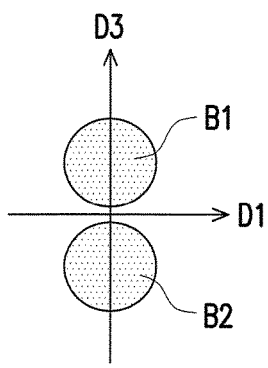
FIG. 6B to FIG. 6D are respectively schematic diagrams of optical fields of the optical transmitter module of FIG. 6A corresponding to the optical fields OF1 and OF2 in FIG. 5E and the optical field OF3 in FIG. 5G.
Figure 6C:
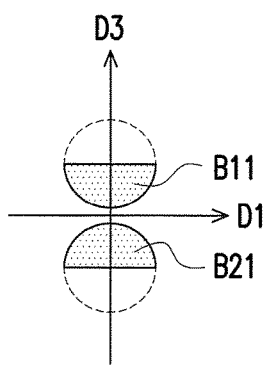
Figure 6D:
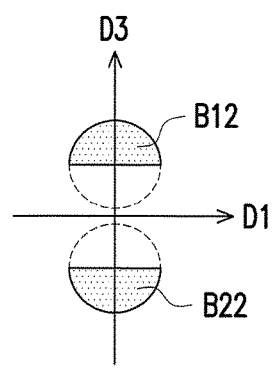

In the foregoing embodiments, each of the optical transmitter modules is only disposed with one single light source, but the invention is not limited thereto. FIG. 6A is a schematic top view of an optical transmitter module according to a fifth embodiment of the invention. FIG. 6B to FIG. 6D are respectively schematic diagrams of optical fields of the optical transmitter module of FIG. 6A corresponding to the optical fields OF1 and OF2 in FIG. 5E, and the optical field OF3 in FIG. 5F. Referring to FIG. 6A to FIG. 6D, an optical transmitter module 500 is similar to the optical transmitter module 200, where the same elements are indicated by the same reference numbers, and thus the disposition relation and effectiveness related thereto are not repeated hereinafter. A major difference between the optical transmitter module 500 and the optical transmitter module 200 is that, the optical transmitter module 500 is disposed with light sources with different wavelengths for applications in the wavelength division multiplexing.

To be specific, in a beam-splitting integrated optical element 510, a shell SHD includes two second reflective surfaces R2, that is, the number ratio of the first reflective surface R1 and the second reflective surface R2 is 1:2. Further, the number of each of a first lens L1B, the third lens L3 and the optical detector 130 is two. Each of the first lenses L1B is disposed below the first reflective surface R1 and one of the second reflective surfaces R2 so that each of the projection of the first lenses L1B is overlapped with a partial area of the first reflective surface R1 and overlapped with a partial area of one of the second reflective surfaces R2. Therefore, after the first beam B1 from the first light source 120 is collimated by the first lens L1B (the beam maximum width being WMAX), a portion of the first beam B1 is irradiated on the first reflective surface R1 while another portion is irradiated on the second reflective surface R2. In addition, each of the optical detectors 130 is disposed below one of the third lenses L3.

The optical transmitter module 500 further includes at least one second light source 120A. In this embodiment, the number of the second light source 120A is one, but not limited thereto. The second light source 120A is located below one of the first lenses L1B. When the number of each of the first light source 120 and the second light source 120A is greater than one, the first light sources 120 and the second light sources 120A are arranged along the third direction D3.

The first light source 120 is adapted to emit the first beam B1 towards one of the first lenses L1B, and the first beam B1 is collimated by said one of first lenses L1B. The second light source 120A is adapted to emit a second beam B2 towards another one of the first lenses LIB, and the second beam B2 is collimated by said another one of the first lenses L1B. A wavelength of the second beam B2 is different from a wavelength of the first beam B1. The first reflective surface R1 is adapted to reflect a portion of the first beam B1 from said one of the first lenses L1B and a portion of the second beam B2 from said another one of the first lenses L1B and transmit said portion of the first beam B1 (e.g., the first beam B11) and said portion of the second beam B2 (e.g., a second beam B21) along the first direction D1, so that the first beam B11 and the second beam B21 can pass through the second lens L2 to be converged together to an optical fiber that is not illustrated. On the other hand, each of the second reflective surfaces R2 arranged at two sides of the second optical axis OA2 is adapted to respectively transmit another portion of the first beam B1 (e.g., the first beam B12) and another portion of the second beam B2 (e.g., a second beam B22) along the second direction D2, and the corresponding optical detectors 130 are adapted to receive the first beam B12 and the second beam B22, respectively.

Figure 7A:
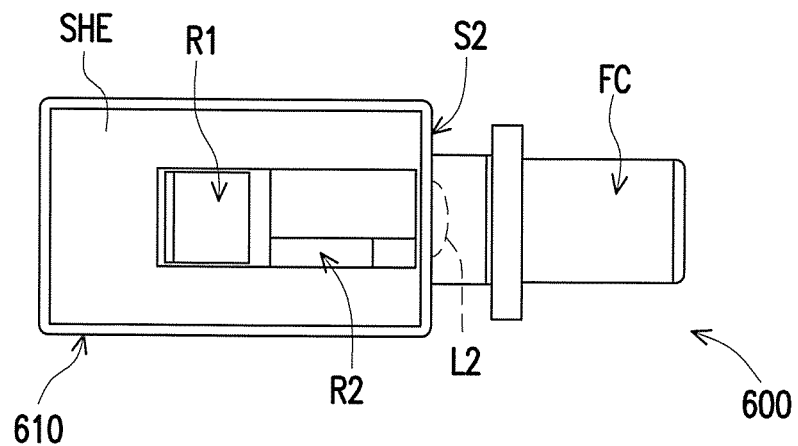
FIG. 7A is a schematic top view of an optical transmitter module according to a sixth embodiment of the invention.
Figure 7B:
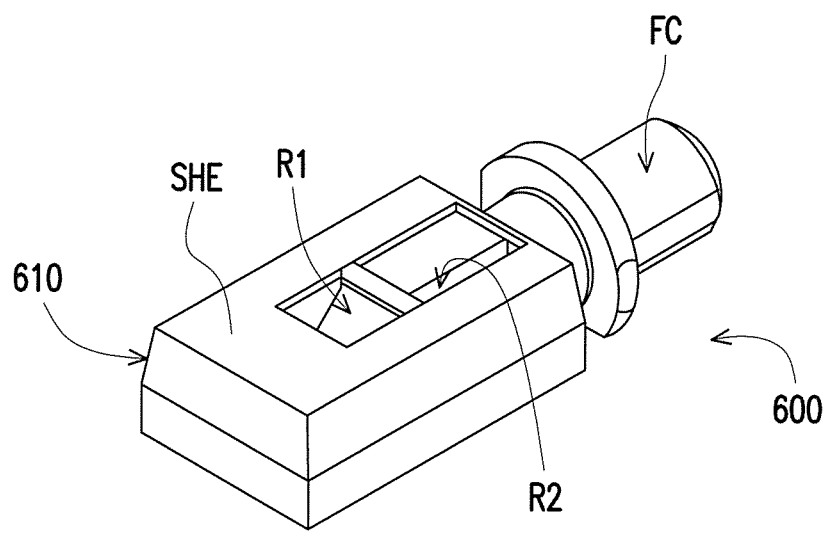
FIG. 7B and FIG. 7C are schematic oblique views of the optical transmitter module in FIG. 7A under different viewing angles.
Figure 7C:
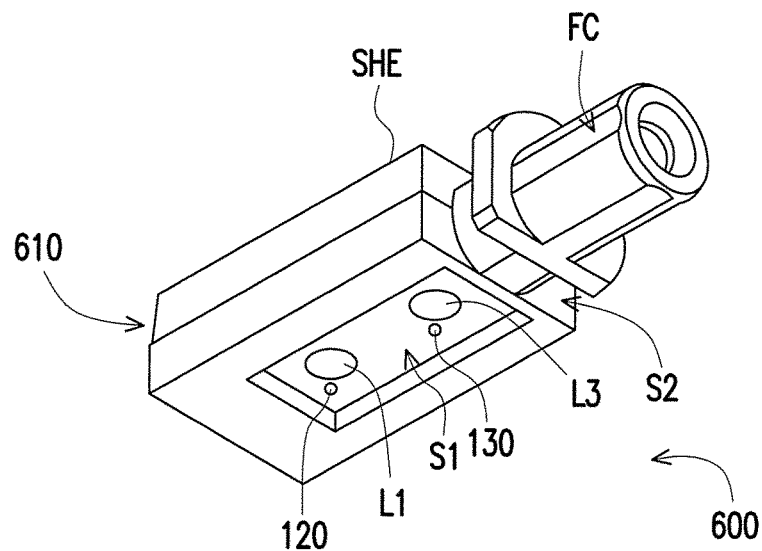

FIG. 7A is a schematic top view of an optical transmitter module according to a sixth embodiment of the invention. FIG. 7B and FIG. 7C are schematic oblique views of the optical transmitter module in FIG. 7A under different viewing angles. Referring to FIG. 7A to FIG. 7C, an optical transmitter module 600 is similar to the optical transmitter module 100, where same elements are indicated by the same reference numbers, and thus the disposition relation and effectiveness related thereto are not repeated hereinafter.

A major difference between the optical transmitter module 600 and the optical transmitter module 100 is that, a beam-splitting integrated optical element 610 of the optical transmitter module 600 further includes a optical fiber connector FC for connecting the optical fiber F in FIG. 2D and FIG. 2E. The optical fiber connector FC is disposed on the second lens L2 and connected to a shell SHE. The optical fiber connector FC may be a LC connector (Lucent Connector) or connectors in other forms. It should be noted that, the beam-splitting integrated optical elements in the foregoing embodiments may also include the optical fiber connector FC, and related description thereof is omitted hereinafter.

Figure 8A:
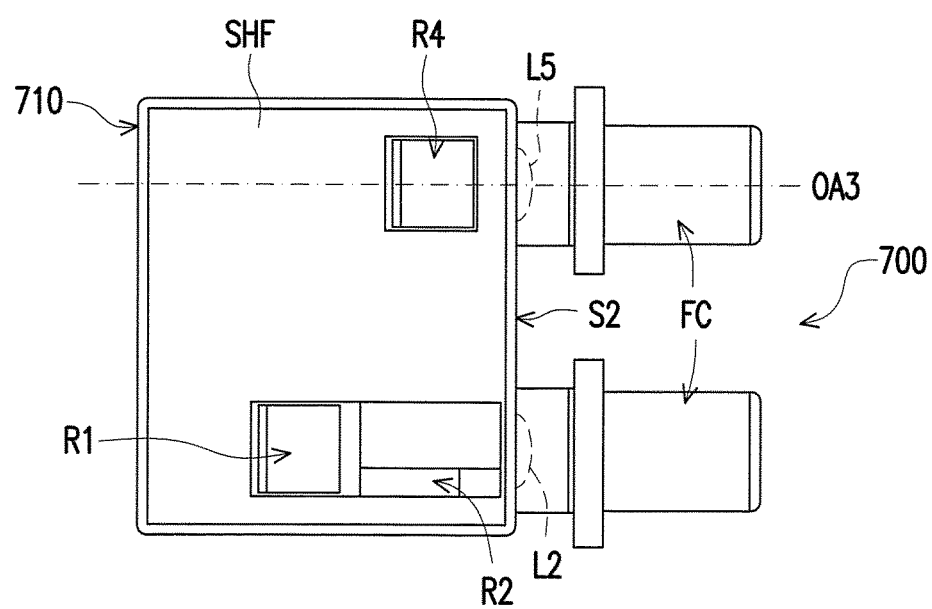
FIG. 8A is a schematic top view of an optical transmitter module according to a seventh embodiment of the invention.
Figure 8B:
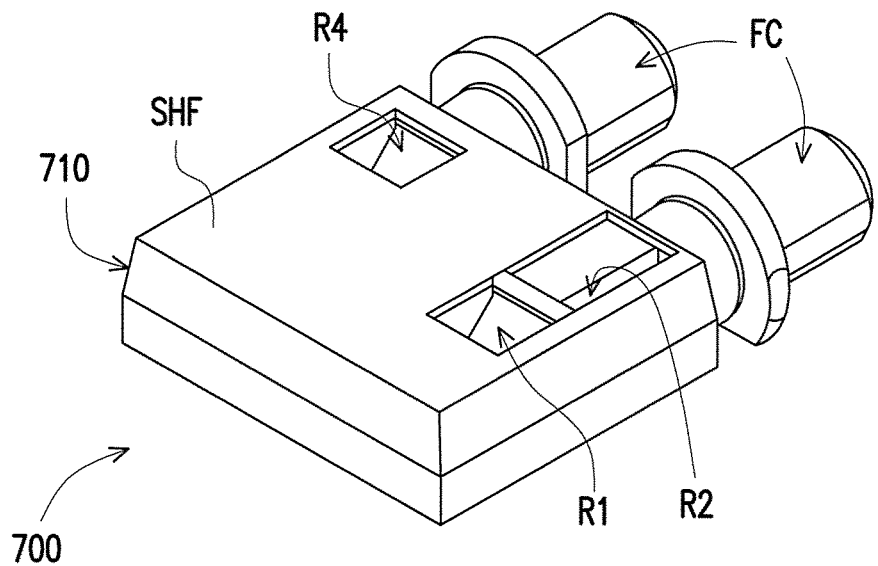
FIG. 8B and FIG. 8C are schematic oblique views of the optical transmitter module in FIG. 8A under different viewing angles.
Figure 8C:
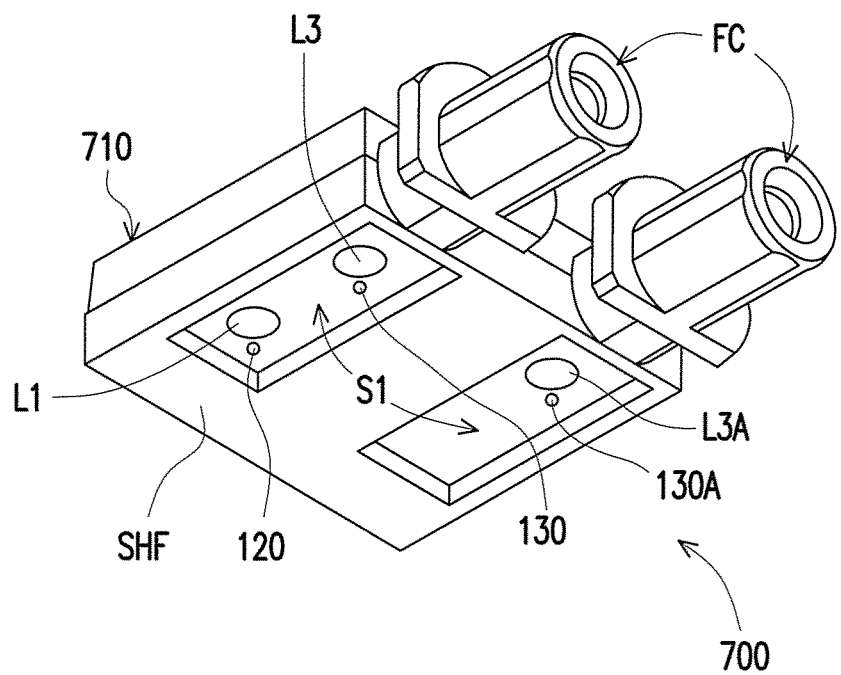

FIG. 8A is a schematic top view of an optical transmitter module according to a seventh embodiment of the invention. FIG. 8B and FIG. 8C are schematic oblique views of the optical transmitter module in FIG. 8A under different viewing angles. Referring to FIG. 8A to FIG. 8C, an optical transmitter module 700 is similar to the optical transmitter module 100, where the same elements are indicated by the same reference numbers, and thus the disposition relation and effectiveness related thereto are not repeated hereinafter.

A major difference between the optical transmitter module 700 and the optical transmitter module 100 is that, a beam-splitting integrated optical element 710 further includes at least one fifth lens L5, and a shell SHF further includes at least one fourth reflective surface R4. In this embodiment, the number of each of the fifth lens L5 and the fourth reflective surface R4 is one, but not limited thereto. The fifth lens L5 is disposed at one side of the second lens L2. The fifth lens L5 has a third optical axis OA3, and the fourth reflective surface R4 is located on a transmission path of a beam from the fifth lens L5 and disposed along the third optical axis OA3.

Further, the beam-splitting integrated optical element 710 may further include a third lens L3A, and the optical transmitter module 700 may further include an optical detector 130A, wherein the third lens L3A and the optical detector 130A are disposed corresponding to the fourth reflective surface R4. After a beam from the outside enters the optical transmitter module 700 through the optical fiber connector to be collimated by the fifth lens L5, said beam is sequentially reflected to the third lens L3A by the fourth reflective surface R4 and then converged to the optical detector 130A. In such architecture, the optical transmitter module 700 not only include the transmitting function but also include the receiving function. In other words, the optical transmitter module 700 may serve as an optical transceiver module.

Figure 9A:
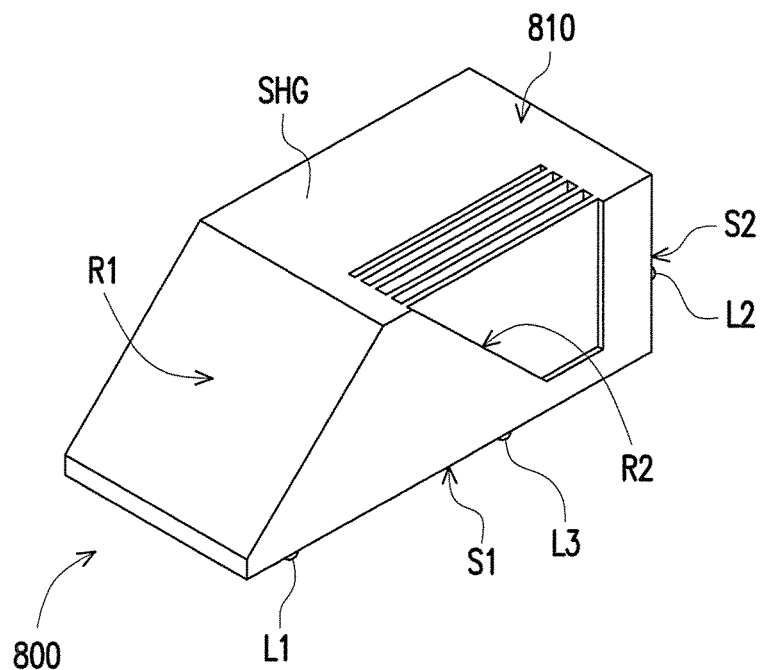
FIG. 9A and FIG. 9B are respectively schematic oblique views of an optical transmitter module according to an eighth embodiment of the invention under different viewing angles.
Figure 9B:
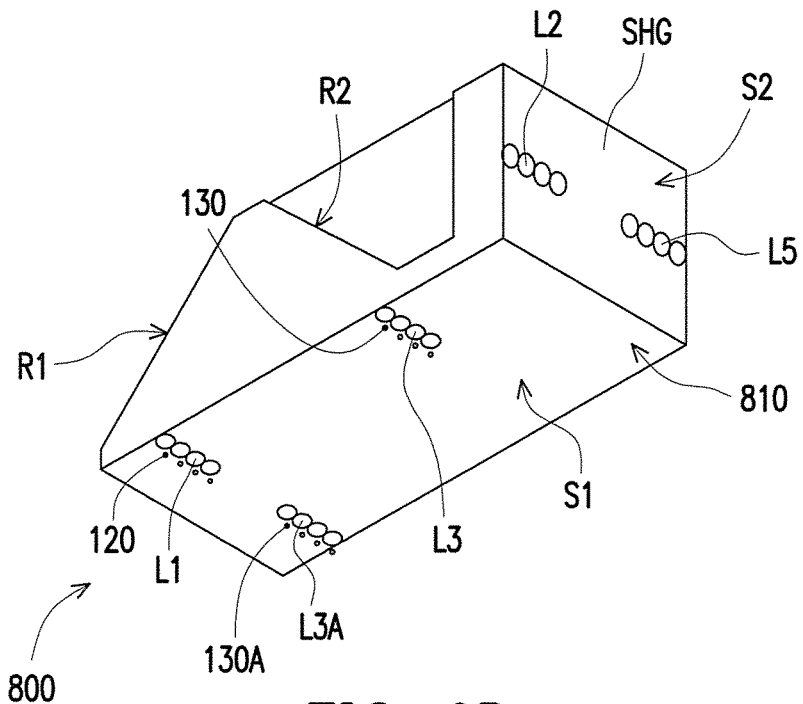

FIG. 9A and FIG. 9B are respectively schematic oblique views of an optical transmitter module according to an eighth embodiment of the invention under different viewing angles. Referring to FIG. 9A and FIG. 9B, an optical transmitter module 800 is similar to the optical transmitter module 700, where the same elements are indicated by the same reference numbers, and thus the disposition relation and effectiveness related thereto are not repeated hereinafter.

A major difference between the optical transmitter module 800 and the optical transmitter module 700 is that, the number of the optical detectors 130A of the optical transmitter module 800 is greater than one. Further, in a beam-splitting integrated optical element 810, the number of the second reflective surface R2 of a shell SHG is greater than one, and the number of each of the first lens L1, the second lens L2, the third lens L3, the third lens L3A and the fifth lens L5 is greater than one, and all said elements may be arranged in an array in order to realize functions of multiple channels beam-splitting.

With the disposition of the fifth lens L5 and the third lens L3A, the optical transmitter module 800 is capable of receiving external beams. Specifically, when a beam from the outside enters the beam-splitting integrated optical element 810 after being collimated by the fifth lens L5, said beam is then reflected by the first reflective surface R1 to pass through the third lens L3A to be converged to the optical detector 130A. In such architecture, the optical transmitter module 800 not only include the transmitting function but also include the receiving function. In other words, the optical transmitter module 800 may serve as an optical transceiver module.

In summary, the beam-splitting integrated optical element of the invention adopts the design in which the bottom edges of the first reflective surface and the second reflective surface are not connected to each other in order to prevent formation of the beam-splitting vertex in the conventional art. As such, the optical power loss and the beam-splitting ratio offset caused by scattering of the beam at the vertex in the conventional art may be solved, so as to facilitate improvements for adverse effects on clarity of the image from light source and integrity of borders caused by scattering of the beam at the vertex. Therefore, other than reducing the alignment difficulty and the alignment time, the beam-splitting integrated optical element can also solve the optical power loss caused by scattering of the beam at the vertex in the conventional art, so that the optical transmitter module using the beam-splitting integrated optical element can also have more preferable light utilization in addition to advantages of low alignment difficulty and short alignment time. In one embodiment, the beam-splitting ratio and the signal transmission amount may also be effectively varied by varying the width of the second reflective surface in the third direction perpendicular to the first optical axis and the second optical axis.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A beam-splitting integrated optical element, comprising:
   a shell, comprising a first lens surface, a second lens surface, at least one first reflective surface and at least one second reflective surface, the second lens surface being perpendicular to the first lens surface, the at least one first reflective surface and the at least one second reflective surface being located above the first lens surface, wherein a bottom edge of each of the at least one first reflective surface close to the first lens surface and a bottom edge of each of the at least one second reflective surface close to the first lens surface are not connected to each other;
   at least one first lens, disposed on the first lens surface, each of the at least one first lens having a first optical axis; and
   at least one second lens, disposed on the second lens surface, each of the at least one second lens having a second optical axis, wherein the at least one first reflective surface is located above the at least one first lens and inclined to the first optical axis and the second optical axis, each of the at least one first reflective surface is adapted to reflect at least a portion of a first beam from the corresponding first lens so that the portion of the first beam is transmitted along a first direction parallel to the second optical axis, each of the at least one second reflective surface is located at at least one side of the corresponding second optical axis and located on a transmission path of another portion of the first beam, and inclining directions of the at least one first reflective surface and the at least one second reflective surface are opposite so that the another portion of the first beam transmitted to the at least one second reflective surface is transmitted along a second direction different from the first direction after being reflected by the at least one second reflective surface.

2. The beam-splitting integrated optical element of claim 1, wherein the at least one second reflective surface is located between the at least one first reflective surface and the second lens surface, and the second direction is perpendicular to the first direction and parallel to the first optical axis.

3. The beam-splitting integrated optical element of claim 2, further comprising:
   at least one third lens, disposed on the first lens surface and located below the at least one second reflective surface, wherein the another portion of the first beam transmitted to the at least one second reflective surface passes through the corresponding third lens along the second direction to be converged by the third lens after being reflected by the at least one second reflective surface.

4. The beam-splitting integrated optical element of claim 1, wherein the at least one first reflective surface and the at least one second reflective surface are arranged along a third direction perpendicular to the first optical axis and the second optical axis, the portion of the first beam is reflected by the at least one first reflective surface to the first direction, and the another portion of the first beam is reflected by the at least one second reflective surface to the second direction which is opposite to the first direction.

5. The beam-splitting integrated optical element of claim 4, wherein the shell further comprises at least one third reflective surface, the at least one third reflective surface being located on the transmission path of the another portion of the first beam reflected by the at least one second reflective surface and adapted to transmit the another portion of the first beam n a fourth direction parallel to the first optical axis.

6. The beam-splitting integrated optical element of claim 5, further comprising:
at least one third lens, disposed on the first lens surface and located below the at least one third reflective surface, wherein the another portion of the first beam transmitted to the at least one second reflective surface passes through the corresponding third lens along the fourth direction to be converged by the third lens after being reflected by the at least one third reflective surface.

7. The beam-splitting integrated optical element of claim 4, further comprising:
at least one third lens, located on the transmission path of the another portion of the first beam reflected by the at least one second reflective surface, the another portion of the first beam reflected by the at least one second reflective surface passing through the corresponding third lens along the second direction to be converged by the third lens.

8. The beam-splitting integrated optical element of claim 1, wherein the at least one first lens is adapted to collimate the first beam.

9. The beam-splitting integrated optical element of claim 1, wherein the at least one second lens is adapted to converge the portion of the first beam to at least one optical fiber connected to the beam-splitting integrated optical element.

10. The beam-splitting integrated optical element of claim 1, further comprising:
at least one optical fiber connector, disposed on the at least one second lens.

11. An optical transmitter module, comprising:
a beam-splitting integrated optical element, comprising:
a shell, comprising a first lens surface, a second lens surface, at least one first reflective surface and at least one second reflective surface, the second lens surface being perpendicular to the first lens surface, the at least one first reflective surface and the at least one second reflective surface being located above the first lens surface, wherein a bottom edge of each of the at least one first reflective surface close to the first lens surface and a bottom edge of each of the at least one second reflective surface close to the first lens surface are not connected to each other;
at least one first lens, disposed on the first lens surface, each of the at least one first lens having a first optical axis; and
at least one second lens, disposed on the second lens surface, each of the at least one second lens having a second optical axis;
at least one first light source, wherein each of the at least one first light source is disposed below one of the at least one first lens and adapted to emit a first beam towards the corresponding first lens, the at least one first reflective surface is located above the at least one first lens and inclined to the first optical axis and the second optical axis, each of the at least one first reflective surface is adapted to reflect at least a portion of the first beam from the corresponding first lens so that the portion of the first beam is transmitted along a first direction parallel to the second optical axis, each of the at least one second reflective surface is located at at least one side of the corresponding second optical axis and located on a transmission path of another portion of the first beam, and inclining directions of the at least one first reflective surface and the at least one second reflective surface are opposite so that the another portion of the first beam transmitted to the at least one second reflective surface is transmitted along a second direction different from the first direction after being reflected by the at least one second reflective surface; and
at least one optical detector, located on the transmission path of the another portion of the first beam reflected by the at least one second reflective surface to receive the another portion of the first beam reflected by the at least one second reflective surface.

12. The optical transmitter module of claim 11, wherein the at least one second reflective surface is located between the at least one first reflective surface and the second lens surface, and the second direction is perpendicular to the first direction and parallel to the first optical axis.

13. The optical transmitter module of claim 12, wherein the beam-splitting integrated optical element further comprises:
at least one third lens, disposed on the first lens surface and located below the at least one second reflective surface, wherein the another portion of the first beam transmitted to the at least one second reflective surface passes through the corresponding third lens along the second direction to be converged by the third lens after being reflected by the at least one second reflective surface.

14. The optical transmitter module of claim 11, wherein the at least one first reflective surface and the at least one second reflective surface are arranged along a third direction perpendicular to the first optical axis and the second optical axis, the portion of the first beam is reflected by the at least one first reflective surface to the first direction, and the another portion of the first beam is reflected by the at least one second reflective surface to the second direction which is opposite to the first direction.

15. The optical transmitter module of claim 14, wherein the shell further comprises at least one third reflective surface, the at least one third reflective surface being located on the transmission path of the another portion of the first beam reflected by the at least one second reflective surface and adapted to transmit the another portion of the first beam in a fourth direction parallel to the first optical axis.

16. The optical transmitter module of claim 15, wherein the beam-splitting integrated optical element further comprises:
at least one third lens, disposed on the first lens surface and located below the at least one third reflective surface, wherein the another portion of the first beam transmitted to the at least one second reflective surface passes through the corresponding third lens along the fourth direction to be converged by the third lens to an optical detector after being reflected by the at least one third reflective surface.

17. The optical transmitter module of claim 14, wherein the beam-splitting integrated optical element further comprises:
   at least one third lens, located on the transmission path of the another portion of the first beam reflected by the at least one second reflective surface, the another portion of the first beam reflected by the at least one second reflective surface passing through the corresponding third lens along the second direction to be converged by the third lens.

18. The optical transmitter module of claim 11, wherein the at least one first lens is adapted to collimate the first beam.

19. The optical transmitter module of claim 11, wherein the at least one second lens is adapted to converge the portion of the first beam to at least one optical fiber connected to the beam-splitting integrated optical element.

20. The optical transmitter module of claim 11, wherein the beam-splitting integrated optical element further comprises:
   at least one optical fiber connector, disposed on the at least one second lens.

* * * * *